(12) United States Patent
Miller, IV

(10) Patent No.: US 11,257,268 B2
(45) Date of Patent: Feb. 22, 2022

(54) AVATAR ANIMATION USING MARKOV DECISION PROCESS POLICIES

(71) Applicant: Magic Leap, Inc., Plantation, FL (US)

(72) Inventor: Thomas Marshall Miller, IV, Los Angeles, CA (US)

(*) Notice: Subject to any disclaimer, the term of this patent is extended or adjusted under 35 U.S.C. 154(b) by 0 days.

(21) Appl. No.: 17/051,755

(22) PCT Filed: Apr. 8, 2019

(86) PCT No.: PCT/US2019/026392
§ 371 (c)(1),
(2) Date: Oct. 29, 2020

(87) PCT Pub. No.: WO2019/212698
PCT Pub. Date: Nov. 7, 2019

(65) Prior Publication Data
US 2021/0166459 A1 Jun. 3, 2021

Related U.S. Application Data

(60) Provisional application No. 62/665,067, filed on May 1, 2018.

(51) Int. Cl.
*G06T 13/40* (2011.01)
*G06F 3/01* (2006.01)
(Continued)

(52) U.S. Cl.
CPC .............. *G06T 13/40* (2013.01); *G06F 3/011* (2013.01); *G06T 19/006* (2013.01); *G10L 17/00* (2013.01)

(58) Field of Classification Search
None
See application file for complete search history.

(56) References Cited

U.S. PATENT DOCUMENTS 6,850,221 B1 2/2005 Tickle
8,504,925 B1 8/2013 Haase
(Continued)

FOREIGN PATENT DOCUMENTS

WO WO 2009/044282 4/2009
WO WO 2019/212698 11/2019

OTHER PUBLICATIONS

International Search Report and Written Opinion, re PCT Application No. PCT/US19/26392, dated Aug. 26, 2019.
(Continued)

*Primary Examiner* — Vu Nguyen
(74) *Attorney, Agent, or Firm* — Knobbe, Martens, Olson & Bear, LLP

(57) ABSTRACT

Real-time animation of a virtual character can be provided by pre-calculating a control policy that identifies a suitable animation clip to animate the next movement of the virtual character. The control policy can be calculated using a Markov decision process (MDP) and can specify an action to take (e.g., a movement) when the virtual character is in a particular state (e.g., in a particular position or pose). The control policy can be determined based on a discounted set of rewards or punishments associated with various actions that can occur in each state. The control policies can be pre-calculated, offline from a runtime animation engine (e.g., in an augmented reality display). The runtime animation engine can use the control policies to select an animation clip to move the virtual character through an environment in real time.

20 Claims, 27 Drawing Sheets

(51) Int. Cl.
*G06T 19/00* (2011.01)
*G10L 17/00* (2013.01)

(56) References Cited

U.S. PATENT DOCUMENTS

| | | | |
|---|---|---|---|
| 2006/0028436 | A1 | 2/2006 | Armstrong |
| 2007/0081123 | A1 | 4/2007 | Lewis |
| 2009/0183193 | A1 | 7/2009 | Miller, IV |
| 2011/0242134 | A1 | 10/2011 | Miller et al. |
| 2012/0127062 | A1 | 5/2012 | Bar-Zeev et al. |
| 2012/0127284 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0309263 | A2 | 10/2015 | Abovitz et al. |
| 2015/0326570 | A1 | 11/2015 | Publicover et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2017/0132828 | A1 | 5/2017 | Zelenin et al. |

OTHER PUBLICATIONS

International Preliminary Report for Patentability, re PCT Application No. PCT/US19/26392, dated Nov. 3, 2020.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC—Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Hauskrecht, et al., "Hierarchical Solution of Markov Decision Processes using Macro-actions," in 10 pages. Proc 14th Conf Undertainty in AI Jul. 1998, pp. 220-229.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Kovar, et al., "Motion Graphs", ACM SIGGRAPH Jul. 2002, vol. 21, pp. 473-482.

Poole, et al., "Artificial Intelligence 2E," Foundations of Computational Agents, 2nd Ed., 2017 Http://artint.info/2e/html/ArtInt2e.Ch9.S5.html.

Prada, et al., "Motion Graphs for Unstructured Textured Meshes," SIGGRAPH '16 Technical Paper, Jul. 24-28, 2016, Anaheim CA, in 14 pages.

Reitsma, et al., "Evaluating Motion Graphs for Character Animation," ACM Transactions on Graphics, vol. V, No. N, Mar. 2007, pp. 1-39.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Thrun et al., "Probabilistic Robots," Planning and Control, Markov Decision Processes, slide presentation, Aug. 2005.

Unity—Manual: Inner Workings of the Navigation System. Version: 2017.3, in 6 pages dated Mar. 22, 2018. Https://docs.unity3d.com/Manual/van-InnerWorkings.html.

Wikipedia: "Markov decision process," in 10 pages, last edited Mar. 25, 2018. https://en.wikipedia.org/wiki/Markov_decision_process.

Wikipedia: "Partially observable Markov decision process," in 6 pages. https://en.wikipedia.org/wiki/Partially_observable_Markov_decision_process, last edited Feb. 17, 2018.

Wikipedia: "Reinforcement learning," in 10 pages. http://en.wikipedia.org/wiki/Reinforcement_learning, last edited Apr. 2, 2018.

Wikipedia: "Navigation mesh," last edited Sep. 22, 2017, in 3 pages. Https://en.wikipedia_org/wiki/Navigation_mesh.

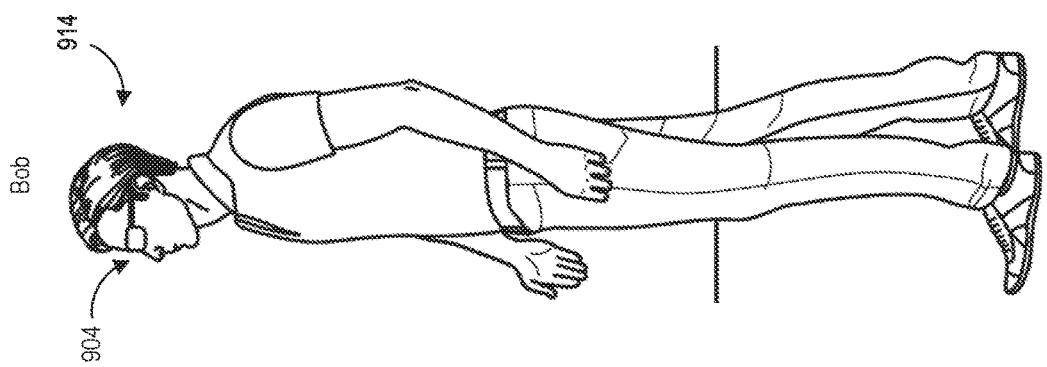
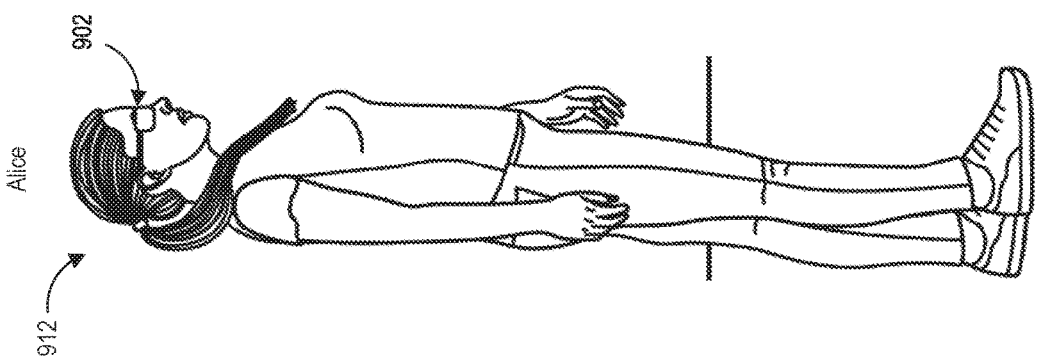
FIG. 9B

AVATAR ANIMATION USING MARKOV DECISION PROCESS POLICIES

CROSS-REFERENCE TO RELATED APPLICATIONS

The present application claims the benefit of priority to U.S. Patent Application No. 62/665,067, filed May 1, 2018, entitled AVATAR ANIMATION USING MARKOV DECISION PROCESS POLICIES, which is hereby incorporated by reference herein in its entirety.

FIELD

The present disclosure relates to virtual reality and augmented reality, including mixed reality, imaging and visualization systems and more particularly to generating realistic, controllable movement of a virtual avatar.

BACKGROUND

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

SUMMARY

Real-time animation of a virtual character can be provided by pre-calculating a control policy that identifies a suitable animation clip to animate the next movement of the virtual character. The control policy can be calculated using a Markov decision process (MDP) and can specify an action to take (e.g., a movement) when the virtual character is in a particular state (e.g., in a particular position or pose). The control policy can be determined based on a discounted set of rewards or punishments associated with various actions that can occur in each state. The control policies can be pre-calculated, offline from a runtime animation engine (e.g., in an augmented reality display). The runtime animation engine can use the control policies to select an animation clip to move the virtual character through an environment in real time.

Although certain embodiments of the systems and methods for avatar animation using MDP policies are described in the context of augmented, mixed, or virtual reality, they are not so limited, and can be applied to gaming, movies, or visual effects (VFx).

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims.

FIG. 9B illustrates an example telepresence session.

FIG. 12 illustrates an example of a motion graph, which shows a variety of states an avatar can transition between.

Figure 1:
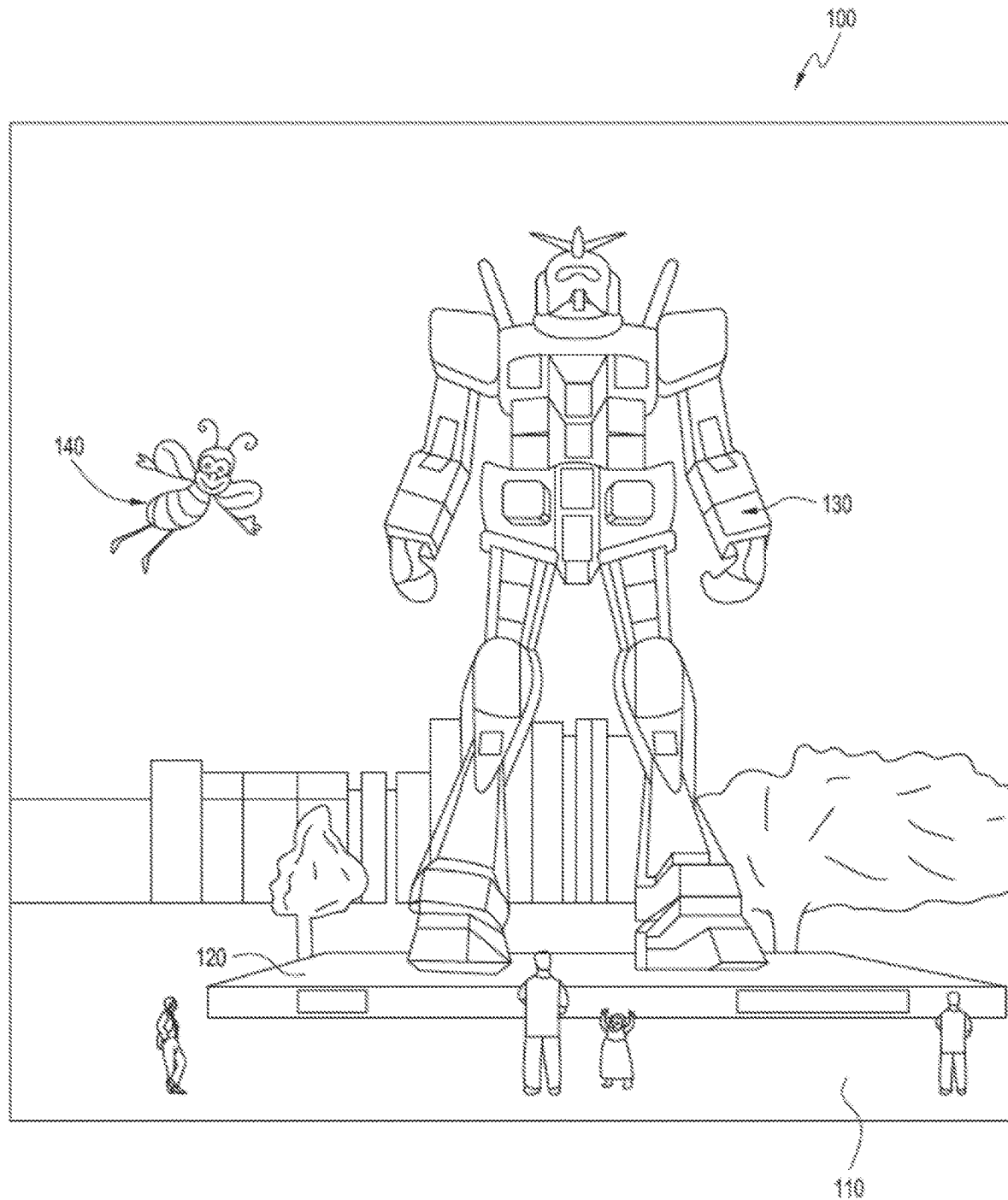
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A virtual avatar may be a virtual representation of a real or fictional person (or creature or personified object) in an AR/VR/MR environment. For example, during a telepresence session in which two AR/VR/MR users are interacting with each other, a viewer can perceive an avatar of another user in the viewer's environment and thereby create a tangible sense of the other user's presence in the viewer's environment. The avatar can also provide a way for users to interact with each other and do things together in a shared virtual environment. For example, a student attending an online class can perceive and interact with avatars of other students or the teacher in a virtual classroom. As another example, a user playing a game in an AR/VR/MR environment may view and interact with avatars of other players in the game.

Embodiments of the disclosed systems and methods may provide for improved animation of avatars and a more realistic interaction between a user of the wearable system and avatars in the user's environment. Although the examples in this disclosure generally describe animating a human-shaped avatar, similar techniques can also be applied to animals, fictitious creatures, objects, etc.

A wearable device can include a display for presenting an interactive VR/AR/MR environment that includes a high fidelity digital avatar. For a realistic VR/AR/MR experience, the wearable device will need to be able to animate avatars as moving throughout the environment. For example, an avatar may be displayed as standing at an initial position (e.g., next to the user) and in an initial orientation (e.g., facing a user), and during the VR/AR/MR interaction, the avatar should move (e.g., walk, run, shuffle, jump, crawl, fly, etc.) to a final position (e.g., toward a door) with a final orientation (e.g., facing the doorway). Embodiments of the disclosed technology have the capability of creating high quality or high fidelity movement (also sometimes referred to herein as locomotion) of avatars (or digital representations in general) of any human, animal, character, or object. In order to accomplish this, embodiments of the disclosed process are faster and less resource intense while still maintaining accurate avatar movement.

Examples of systems and methods are provided that animate an avatar (or other digital character) in a limited computation setting, such that the avatar interacts appropriately with the real world (e.g., in real time) and occurrences in the real world (e.g. the avatar stops if a ball suddenly rolls in front of the avatar).

Animation of the avatar can be based on a library of animation clips in which the avatar performs a series of poses. To animate the avatar performing a particular pose, a frame (or frames) from the animation clips can be identified in which the avatar performs that particular pose. Performing an exhaustive search of the library at runtime to find the right clip to animate a particular pose can not only be computationally intensive but can also severely limit the ability to perform the animation in real time.

Real-time animation can be provided by pre-calculating a control policy that identifies the best animation clip to animate the next movement of the avatar. The pre-calculation can be done by a hardware processing system that is separate and offline from the runtime animation engine (which will typically be a component of the wearable display system). The control policy can be communicated to the wearable display device, e.g., as a lookup table which can efficiently be searched at runtime.

The control policy can be calculated using a Markov decision process (MDP). MDP provides a framework for decision making in situations where outcomes are partially random (e.g., determined probabilistically). MDP can generate a control policy, which is a function that specifies an action to take (e.g., a movement) when the avatar is in a particular state (e.g., in a particular pose). The control policy can comprise a set of rules that can be computationally applied to select the next animation frame to control the animation (e.g., movement) of an animated avatar. The control policies generated using the MDP framework are different from the subjective techniques used by individual, human animators to animate an avatar and are a specific, unconventional technological improvement for computer-based animation as compared to manual animation techniques.

The control policy can be determined based on a set of rewards or punishments (e.g., punishments are rewards with negative values) associated with various actions that can occur in each state. For example, movement in a desired direction along a traversable path in the environment can be associated with a positive reward whereas movement into a wall or off of a cliff may be associated with a punishment. MDP can also utilize a discount factor, in which future rewards or punishments are discounted relative to present rewards or punishments. MDP can determine a control policy (often shortened to just policy) that increases or maximizes the net discounted rewards and that identifies the best "next" move for the avatar. The control policies can be pre-calculated, offline from the runtime engine.

The runtime engine (e.g., a rendering engine in an AR/MR/VR display) can access the pre-calculated policies and apply them to the environment of the user to move the avatar throughout the environment. Because the policies can be pre-calculated, the runtime engine can efficiently and quickly (e.g., in real time) use the policies (e.g., as lookups in a table) to identify the best way to move the avatar from a starting state (e.g., starting position or starting pose) to a desired ending (or goal) state (e.g., ending position or ending pose).

Accordingly, a variety of implementations of systems and methods for calculating animation control policies that can be used to animate avatar movement in real time will be provided below.

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
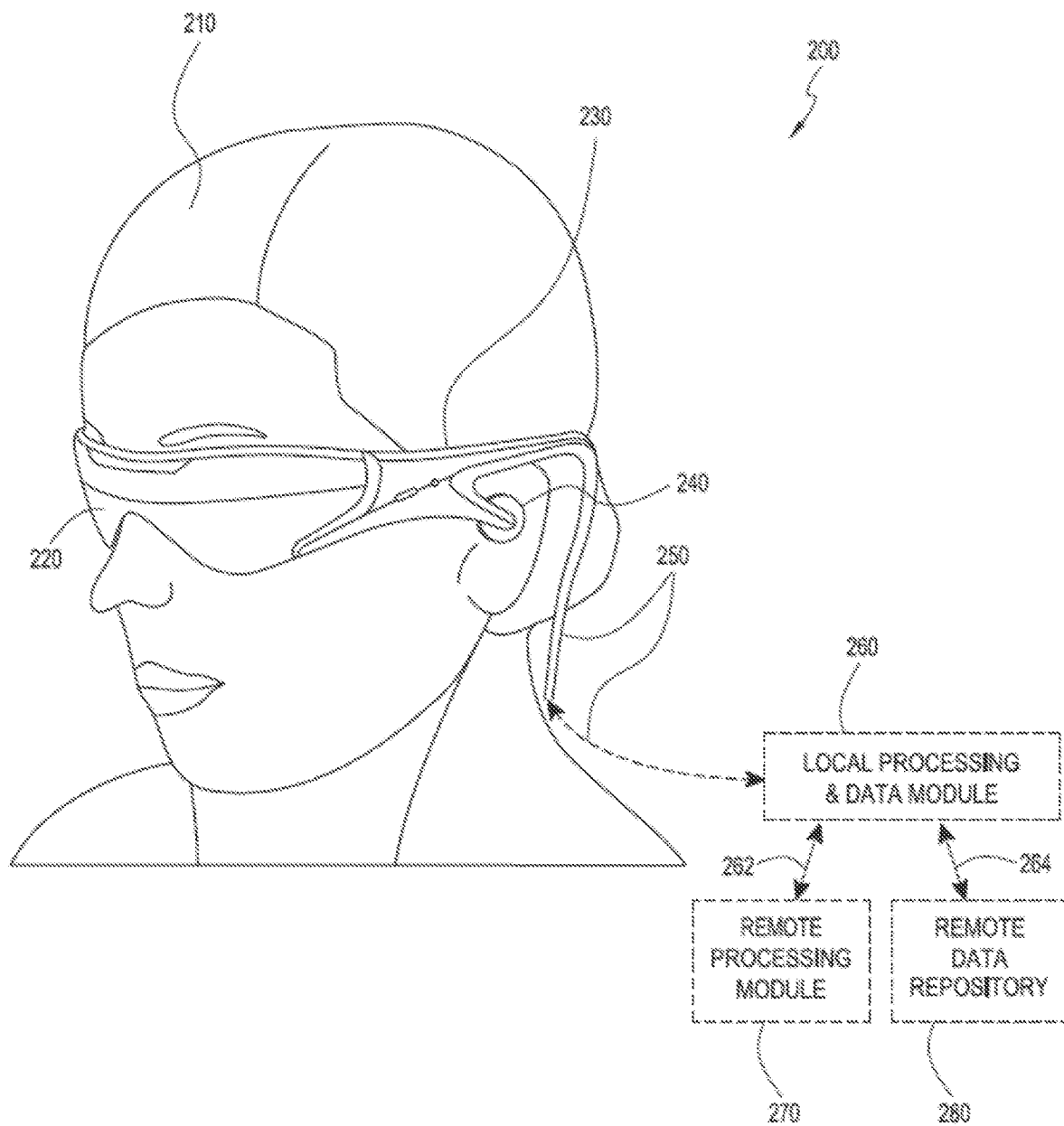
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUS), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the interact or other networking configuration in a "cloud" resource configuration. In some embodiments, all data is stored and all computations are performed in the local processing and data module, allowing fully autonomous use from a remote module.

Example Components of a Wearable System

Figure 3:
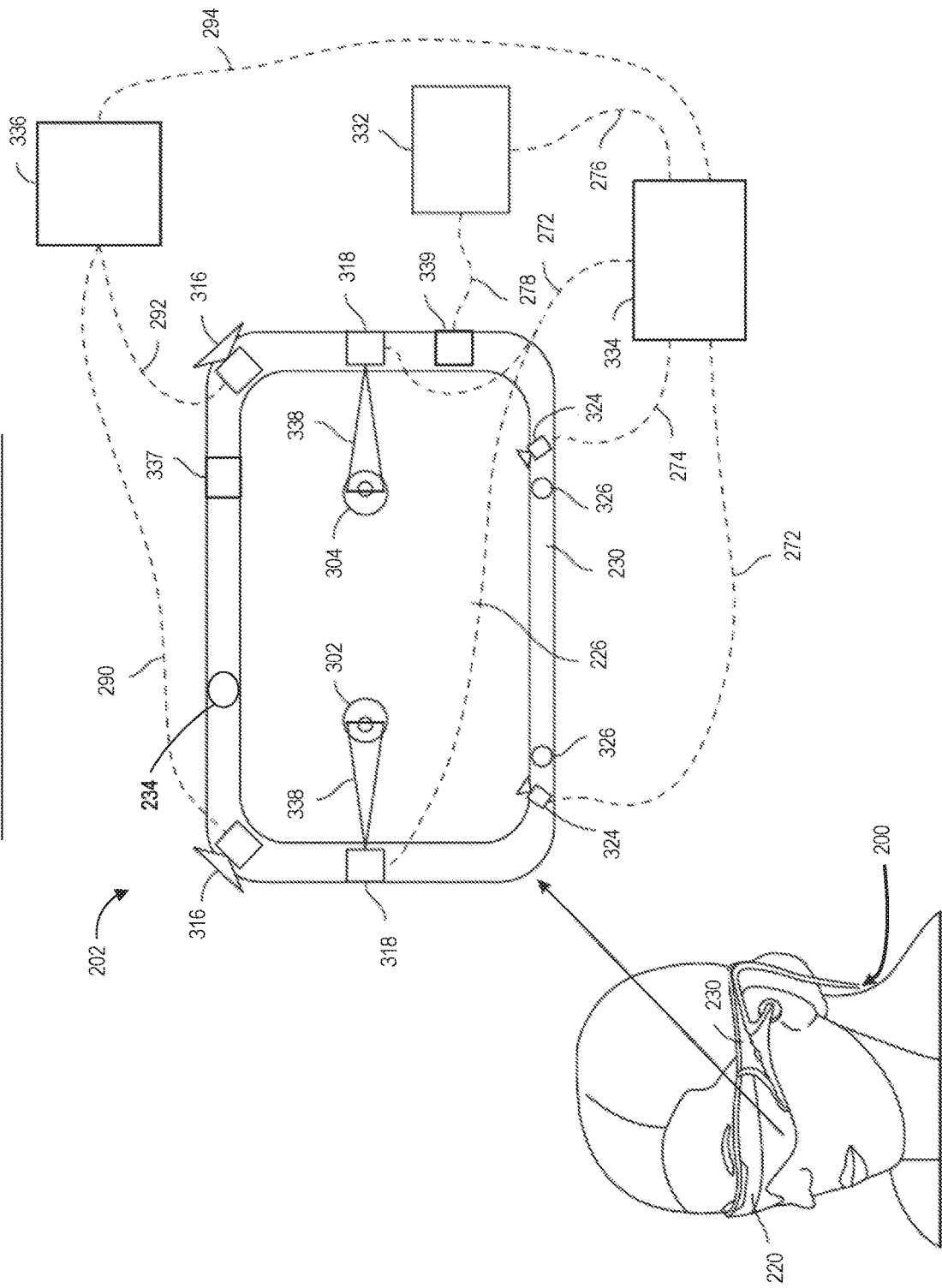
FIG. 3 schematically illustrates example components of a wearable system.

FIG. 3 schematically illustrates example components of a wearable system. FIG. 3 shows a wearable system 200 which can include a display 220 and a frame 230. A blown-up view 202 schematically illustrates various components of the wearable system 200. In certain implements, one or more of the components illustrated in FIG. 3 can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 3 provides a basic idea of some of the various components and types of data that may be collected, analyzed, and stored through the wearable system.

FIG. 3 shows an example wearable system 200 which can include the display 220. The display 220 can comprise a display lens 226 that may be mounted to a user's head or a housing or frame 230, which corresponds to the frame 230. The display lens 226 may comprise one or more transparent mirrors positioned by the housing 230 in front of the user's eyes 302, 304 and may be configured to bounce projected light 338 into the eyes 302, 304 and facilitate beam shaping, while also allowing for transmission of at least some light from the local environment. The wavefront of the projected light beam 338 may be bent or focused to coincide with a desired focal distance of the projected light. As illustrated, two wide-field-of-view machine vision cameras 316 (also referred to as world cameras) can be coupled to the housing 230 to image the environment around the user. These cameras 316 can be dual capture visible light/non-visible (e.g., infrared) light cameras. The cameras 316 may be part of the outward-facing imaging system 464 shown in FIG. 4. Image acquired by the world cameras 316 can be processed by the pose processor 336. For example, the pose processor 336 can implement one or more object recognizers 708 (e.g., shown in FIG. 7) to identify a pose of a user or another person in the user's environment or to identify a physical object in the user's environment.

With continued reference to FIG. 3, a pair of scanned-laser shaped-wavefront (e.g., for depth) light projector modules with display mirrors and optics configured to project light 338 into the eyes 302, 304 are shown. The depicted view also shows two miniature infrared cameras 324 paired with infrared light (such as light emitting diodes "LED"s), which are configured to be able to track the eyes 302, 304 of the user to support rendering and user input. The cameras 324 may be part of the inward-facing imaging system 462 shown in FIG. 4 The wearable system 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU described with reference to FIG. 2A The depicted system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 260 shown in FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, or a depth sensing camera. In certain implementations, where the cameras 316 have depth sensing ability, the cameras 316 may also be considered as depth sensors 234.

Also shown is a processor 332 configured to execute digital or analog processing to derive pose from the gyro, compass, or accelerometer data from the sensor assembly 339. The processor 332 may be part of the local processing and data module 260 shown in FIG. 2. The wearable system 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 337 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 316 (which may be part of the outward-facing imaging system 464 shown in FIG. 4). Based on the images acquired by the world cameras 316, the wearable system 200 can detect objects in the environment (e.g., by using one or more object recognizers 708 shown in FIG. 7). The wearable system can further use data acquired by the GPS 337 to interpret the characters.

The wearable system 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 can be communicatively coupled (e.g., via wired or wireless links) to other components of the wearable system 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294 respectively.

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers 339 may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a beltpack and configured to communicate with other components of the wearable system via wireless communication, such as ultra-wideband, Bluetooth, etc., or via wired communication. The depicted housing 230 preferably is head-mountable and wearable by the user. However, some components of the wearable system 200 may be worn to other portions of the user's body. For example, the speaker 240 may be inserted into the ears of a user to provide sound to the user.

Regarding the projection of light 338 into the eyes 302, 304 of the user, in some embodiment, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the horopter in focus, and all other objects at varying degrees of defocus (e.g., using intentionally-created blurring). Preferably, the system 220 renders to the user at a frame rate of about 60 frames per second or greater. As described above, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the wearable system 200 of some embodiments allows the user's eye to a function in a more natural manner.

Such a wearable system 200 may eliminate or reduce the incidences of eye strain, headaches, and other physiological symptoms typically observed with respect to virtual reality devices. To achieve this, various embodiments of the wearable system 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Waveguide Stack Assembly

Figure 4:
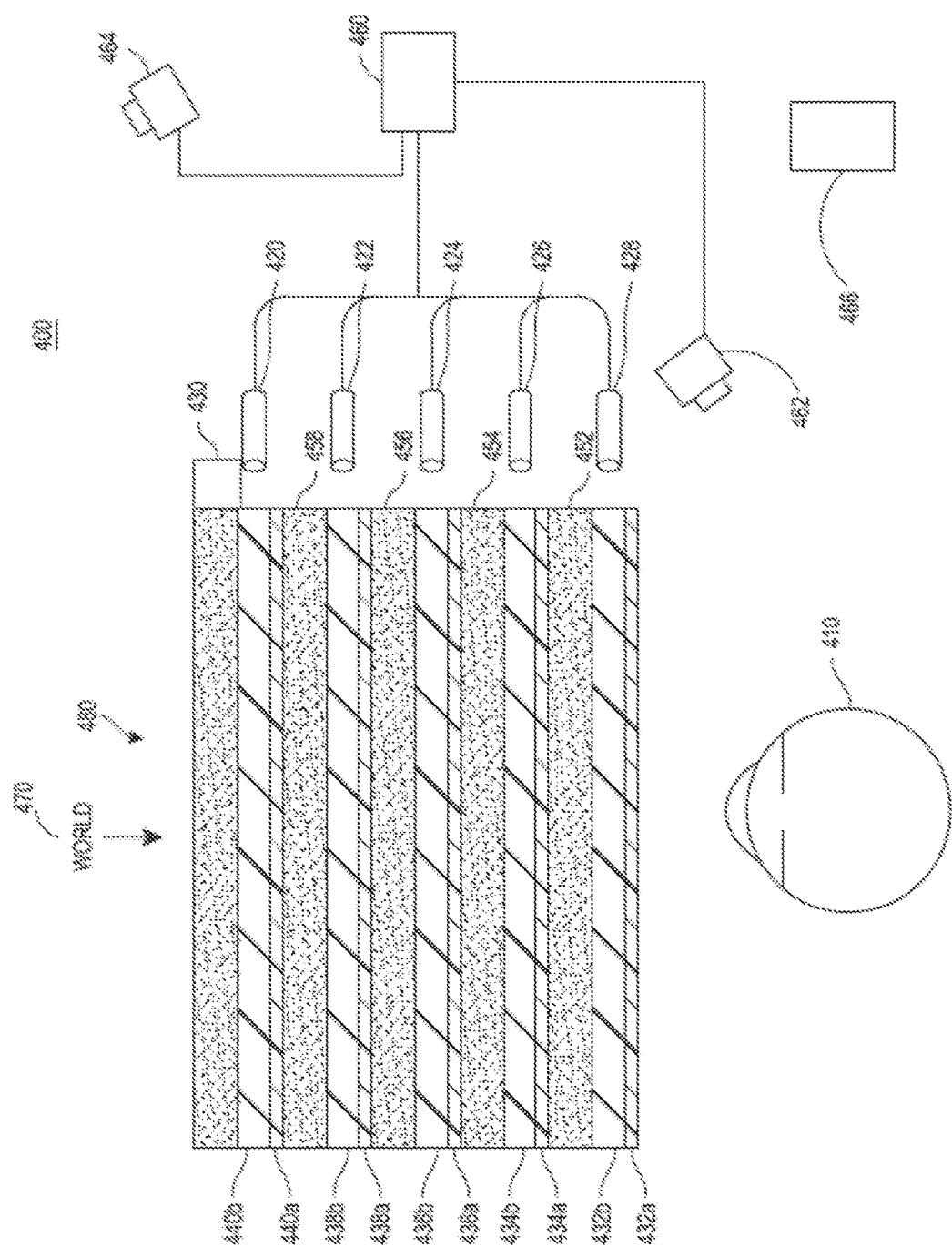
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b, In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguided/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to Where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) Which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Processes of User Interactions with a Wearable System

Figure 5:
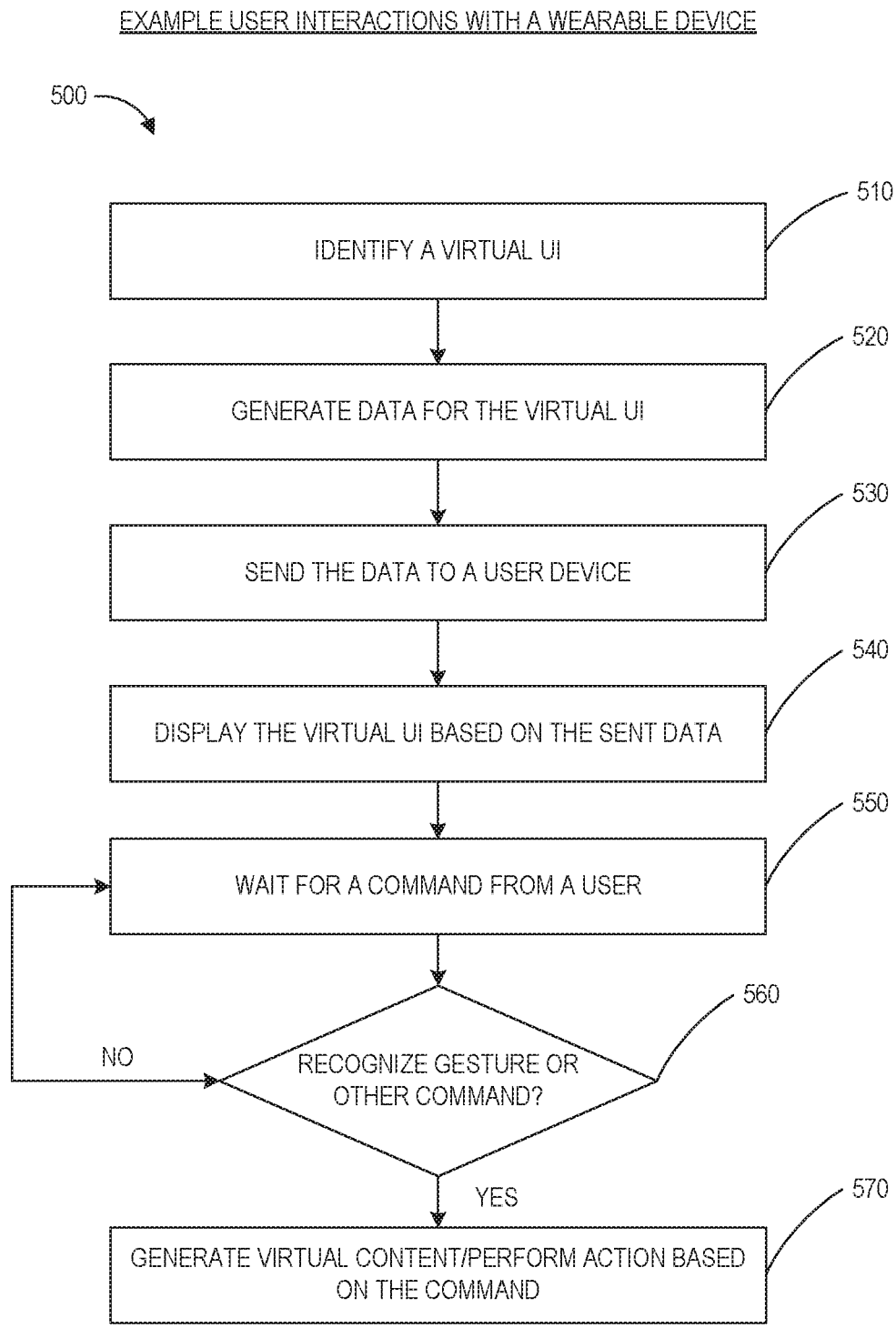
FIG. 5 is a process flow diagram of an example of a method for interacting with a virtual user interface.

FIG. 5 is a process flow diagram of an example of a method 500 for interacting with a virtual user interface. The method 500 may be performed by the wearable system described herein. Embodiments of the method 500 can be used by the wearable system to detect persons or documents in the FOV of the wearable system.

At block 510, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
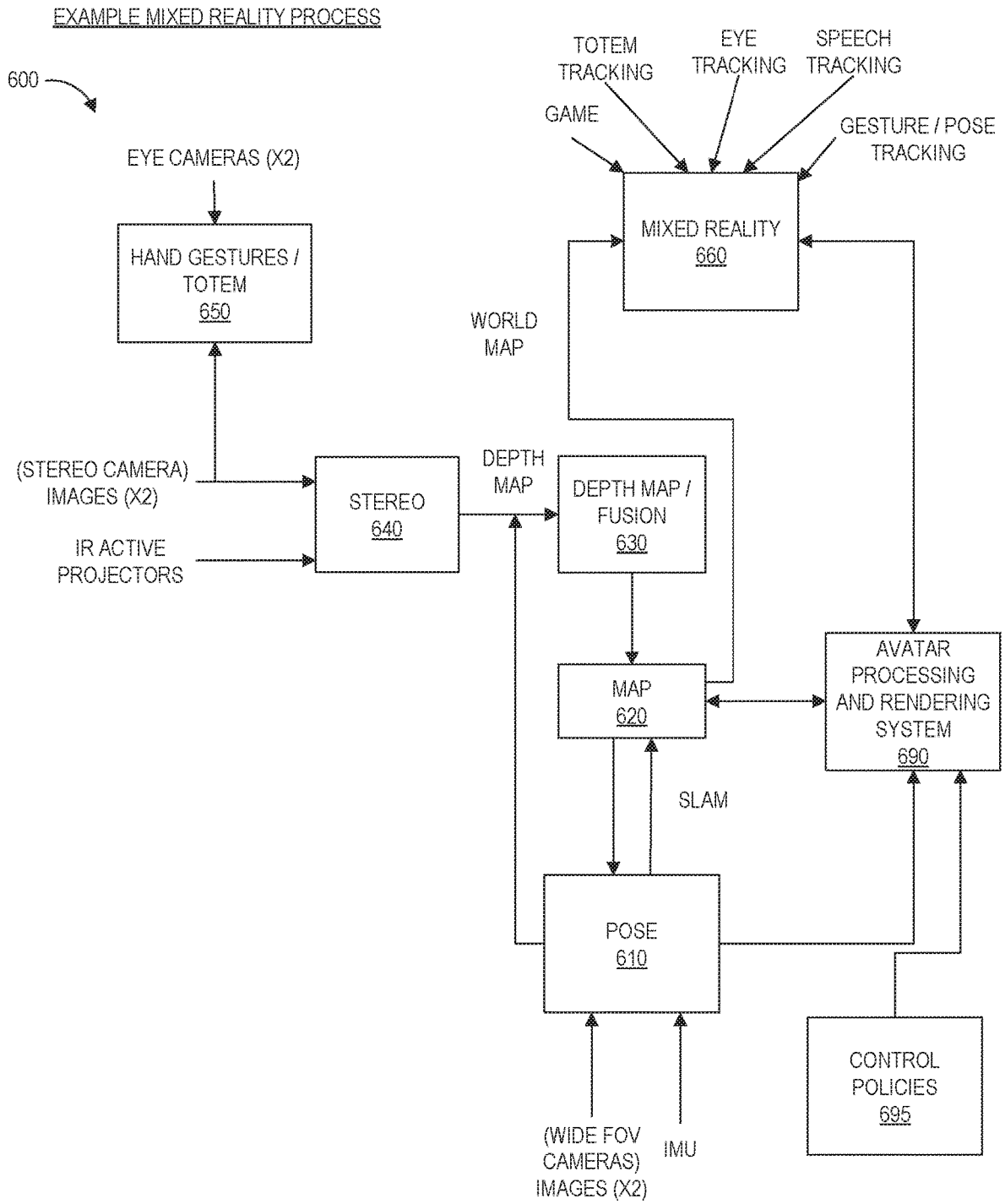
FIG. 6A is a block diagram of another example of a wearable system which can comprise an avatar processing and rendering system.

FIG. 6A is a block diagram of another example of a wearable system which can comprise an avatar processing and rendering system 690 in a mixed reality environment. The wearable system 600 may be part of the wearable system 200 shown in FIG. 2. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the embodiment depicted in FIG. 6A, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. As will be further described with reference to FIGS. 11-20, the avatar processing and rendering system 690 can use one or more control policies 695 to animate avatar movements in real time. The control policies 695 can be pre-calculated, offline from the system 695, and used in real-time to render avatar locomotion. The control policies 695 can be calculated using Markov decision process (MDP) techniques. Some or all of the avatar processing and rendering system 690 can be implemented as part of the local processing and data module 260 or the remote processing module 262, 264 alone or in combination. In various embodiments, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) communicate via a network, for example, as will be described with reference to FIGS. 9A and 9B.

Figure 6B:
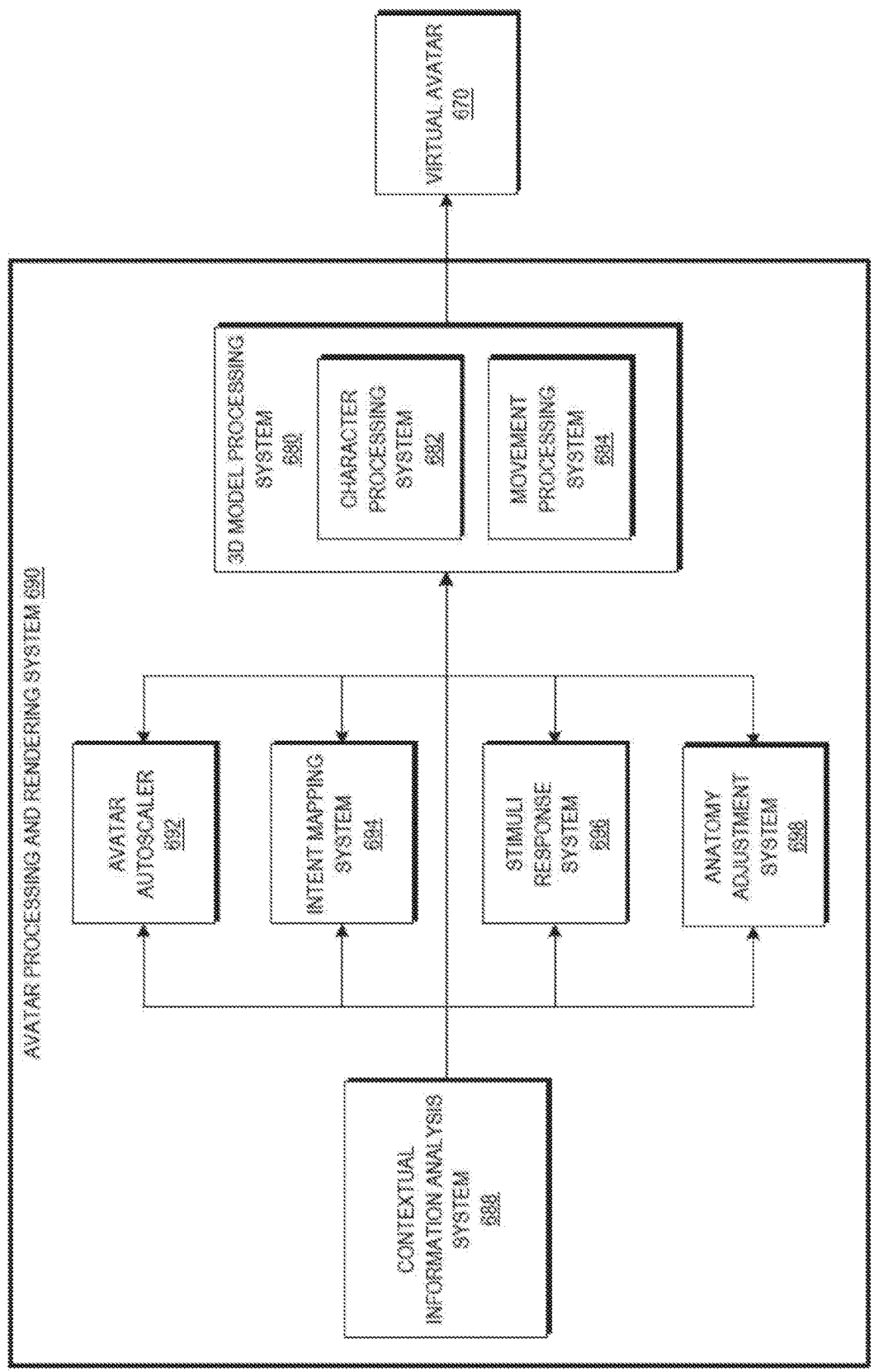
FIG. 6B illustrates example components of an avatar processing and rendering system.

FIG. 6B illustrates an example avatar processing and rendering system 690. The avatar processing and rendering system 690 can implement the mesh transfer techniques described with reference to FIGS. 11-14C. The example avatar processing and rendering system 690 can comprise a 3D model processing system 680, a contextual information analysis system 688, an avatar autoscaler 692, an intent mapping system 694, an anatomy adjustment system 698, a stimuli response system 696, alone or in combination. The system 690 is intended to illustrate functionalities for avatar processing and rendering and is not intended to be limiting. For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 2 and 3. For example, the contextual information analysis system 688 can analyze environments and objects (including physical or virtual objects) of a user's environment or an environment in which the user's avatar is rendered, using images acquired by the outward-facing imaging system 464 of the user or the viewer of the user's avatar. The contextual information analysis system 688 can analyze such images alone or in combination with a data acquired from location data or world maps (e.g., maps 620, 710, 910) to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the avatar such that a portion of the user's avatar's body (e.g., the head) is not at an uncomfortable (or unrealistic) position with respect to the other portions of the user's body (e.g., the avatar's head is not turned 270 degrees). In certain implementations, one or more object recognizers 708 (shown in FIG. 7) may be implemented as part of the contextual information analysis system 688.

The avatar autoscaler 692, the intent mapping system 694, and the stimuli response system 696, and anatomy adjustment system 698 can be configured to determine the avatar's characteristics based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the user's eye level such that the user does not need to look down at the avatar or look up at the avatar respectively. The intent mapping system 694 can determine an intent of a user's interaction and map the intent to an avatar (rather than the exact user interaction) based on the environment that the avatar is rendered in. For example, an intent of a first user may be to communicate with a second user in a telepresence session (see, e.g., FIG. 9B). Typically, two people face each other when communicating. The intent mapping system 694 of the first user's wearable system can determine that such a face-to-face intent exists during the telepresence session and can cause the first user's wearable system to render the second user's avatar to be facing the first user. If the second user were to physically turn around, instead of rendering the second user's avatar in a turned position (which would cause the back of the second user's avatar to be rendered to the first user), the first user's intent mapping system 694 can continue to render the second avatar's face to the first user, which is the inferred intent of the telepresence session (e.g., face-to-face intent in this example).

The stimuli response system 696 can identify an object of interest in the environment and determine an avatar's response to the object of interest. For example, the stimuli response system 696 can identify a sound source in an avatar's environment and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the user's pose based on biological features. For example, the anatomy adjustment system 698 can be configured to adjust relative positions between the user's head and the user's torso or between the user's upper body and lower body based on a discomfort curve.

The 3D model processing system 680 can be configured to animate and cause the display 220 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). The movement processing system 684 can be configured to animate the avatar, such as, e.g., by changing the avatar's pose, by moving the avatar around in a user's environment, or by animating the avatar's facial expressions, etc. As will further be described herein, the virtual avatar can be animated using rigging techniques. In some embodiments, an avatar is represented in two parts: a surface representation (e.g., a deformable mesh) that is used to render the outward appearance of the virtual avatar and a hierarchical set of interconnected joints (e.g., a core skeleton) for animating the mesh. In some implementations, the virtual character processing system 682 can be configured to edit or generate surface representations, while the movement processing system 684 can be used to animate the avatar by moving the avatar, deforming the mesh, etc. For example, in some implementations, the movement processing system 684 performs embodiments of the avatar locomotion processes described herein (e.g., the process 2000 described with reference to FIG. 20).

Examples of Mapping a User's Environment

Figure 7:
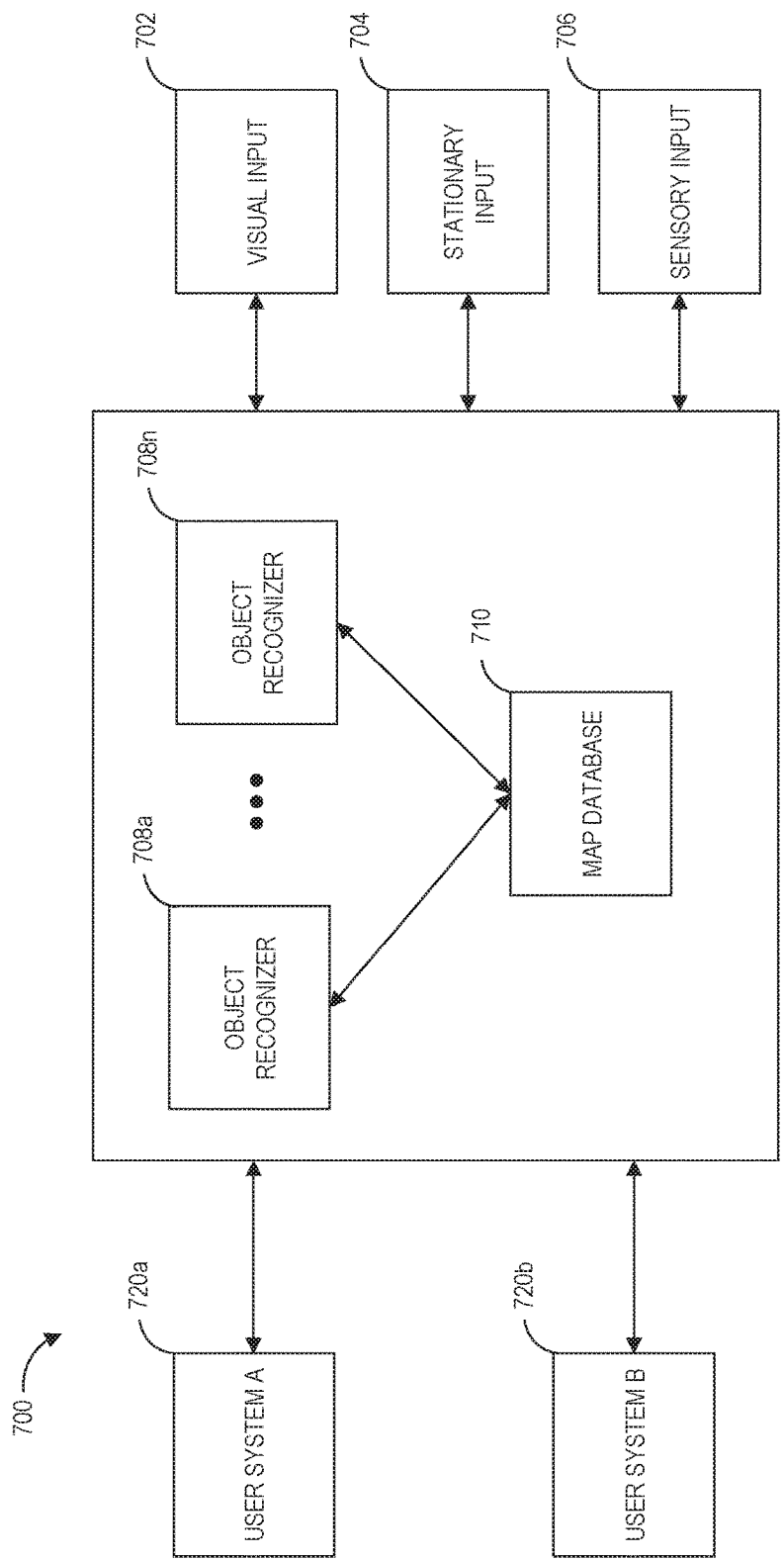
FIG. 7 is a block diagram of an example of a wearable system including various inputs into the wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, doors, user input devices, televisions, documents, other objects in the user's environment, etc. One or more object recognizers may be specialized for object with certain characteristics. For example, the object recognizer 708a may be used to recognizer faces, while another object recognizer may be used recognize cuboidal objects (e.g., desks, chairs, sofas, tables, etc.).

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons, objects, or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
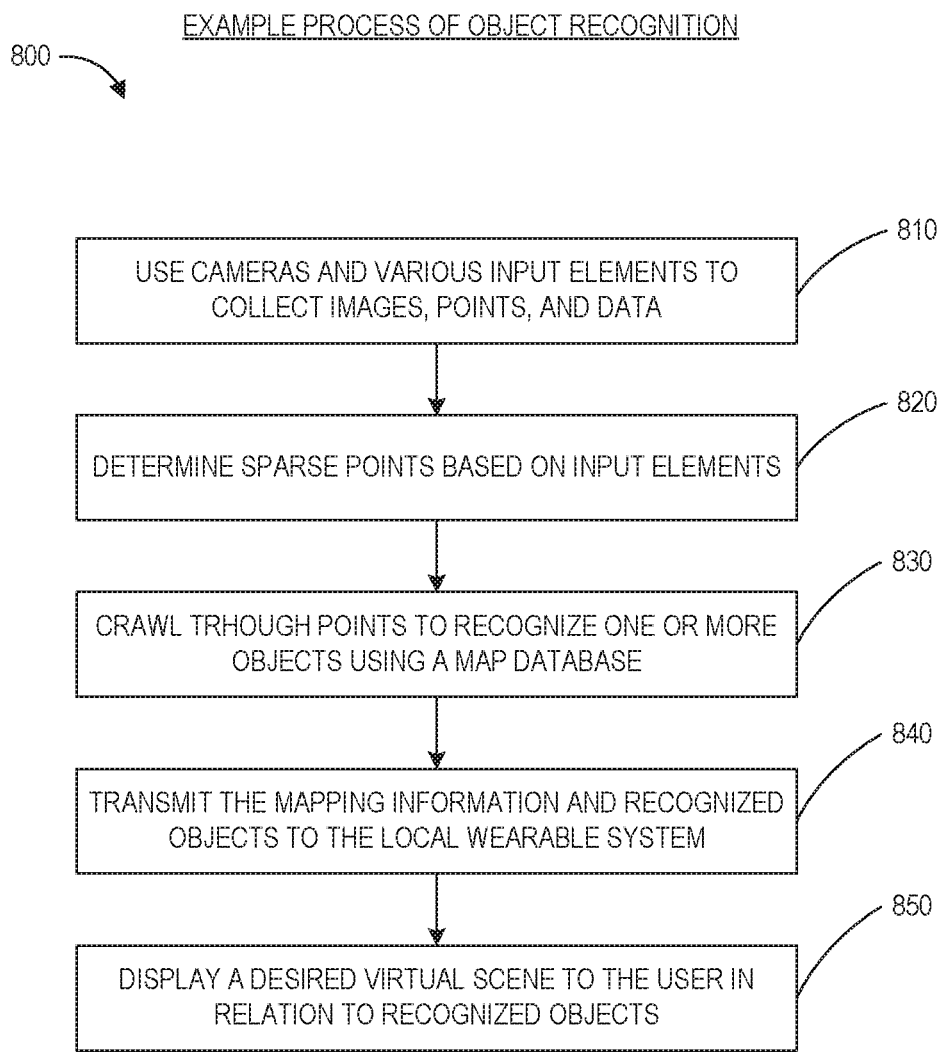
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications Among Multiple Wearable Systems

Figure 9A:
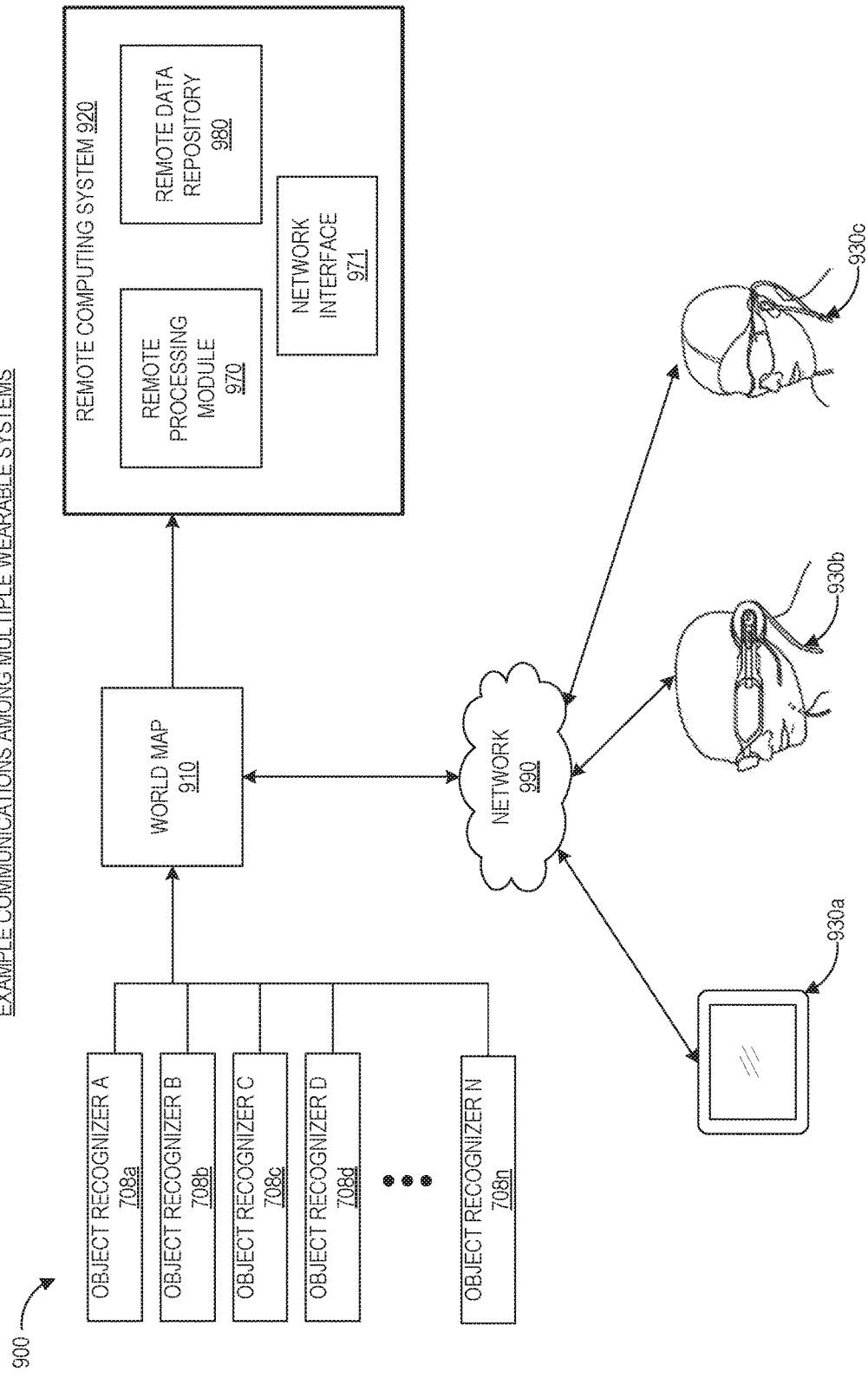
FIG. 9A schematically illustrates an overall system view depicting multiple wearable systems interacting with each other.

FIG. 9A schematically illustrates an overall system view depicting multiple user devices interacting with each other. The computing environment 900 includes user devices 930a, 930b, 930c. The user devices 930a, 930b, and 930c can communicate with each other through a network 990. The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about a specific user's physical and/or virtual worlds. Data storage 980 can store information related to users, users' environment (e.g., world maps of the user's environment), or configurations of avatars of the users. The remote data repository may be an embodiment of the remote data repository 280 shown in FIG. 2. The remote computing system 920 may also include a remote processing module 970. The remote processing module 970 may be an embodiment of the remote processing module 270 shown in FIG. 2. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930b and 930c may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g. 708a, 708b, 708c . . . 708n) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g. 930a, 930b, 930c) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g. 930a, 930b, 930c) to process information about the user and the user's environment. The remote computing system 920 can modify the information acquired by the user devices (e.g. 930a, 930b, 930c), such as, e.g. selectively cropping a user's image, modifying the user's background, adding virtual objects to the user's environment, annotating a user's speech with auxiliary information, etc. The remote computing system 920 can send the processed information to the same and/or different user devices.

Examples of a Telepresence Session

FIG. 9B depicts an example where two users of respective wearable systems are conducting a telepresence session. Two users (named Alice 912 and Bob 914 in this example) are shown in this figure. The two users are wearing their respective wearable devices 902 and 904 which can include an HMD described with reference to FIG. 2 (e.g., the display device 220 of the system 200) for representing a virtual avatar of the other user in the telepresence session. The two users can conduct a telepresence session using the wearable device. Note that the vertical line in FIG. 9B separating the two users is intended to illustrate that Alice 912 and Bob 914 may (but need not) be in two different locations while they communicate via telepresence (e.g., Alice may be inside her office in Atlanta while Bob is outdoors in Boston).

As described with reference to FIG. 9A, the wearable devices 902 and 904 may be in communication with each other or with other user devices and computer systems. For example, Alice's wearable device 902 may be in communication with Bob's wearable device 904, e.g., via the network 990 (shown in FIG. 9A). The wearable devices 902 and 904 can track the users' environments and movements in the environments (e.g., via the respective outward-facing imaging system 464, or one or more location sensors) and speech (e.g., via the respective audio sensor 232). The wearable devices 902 and 904 can also track the users' eye movements or gaze based on data acquired by the inward-facing imaging system 462. In some situations, the wearable device can also capture or track a user's facial expressions or other body movements (e.g., arm or leg movements) where a user is near a reflective surface and the outward-facing imaging system 464 can obtain reflected images of the user to observe the user's facial expressions or other body movements.

A wearable device can use information acquired of a first user and the environment to animate a virtual avatar that will be rendered by a second user's wearable device to create a tangible sense of presence of the first user in the second user's environment. For example, the wearable devices 902 and 904, the remote computing system 920, alone or in combination, may process Alice's images or movements for presentation by Bob's wearable device 904 or may process Bob's images or movements for presentation by Alice's wearable device 902. As further described herein, the avatars can be rendered based on contextual information such as, e.g., a user's intent, an environment of the user or an environment in which the avatar is rendered, or other biological features of a human.

Although the examples only refer to two users, the techniques described herein should not be limited to two users. Multiple users (e.g., two, three, four, five, six, or more) using wearables (or other telepresence devices) may participate in a telepresence session. A particular user's wearable device can present to that particular user the avatars of the other users during the telepresence session. Further, while the examples in this figure show users as standing in an environment, the users are not required to stand. Any of the users may stand, sit, kneel, lie down, walk or run, or be in any position or movement during a telepresence session. The user may also be in a physical environment other than described in examples herein. The users may be in separate environments or may be in the same environment while conducting the telepresence session. Not all users are required to wear their respective HMDs in the telepresence session. For example, Alice 912 may use other image acquisition and display devices such as a webcam and computer screen while Bob 914 wears the wearable device 904.

Examples of a Virtual Avatar

Figure 10:
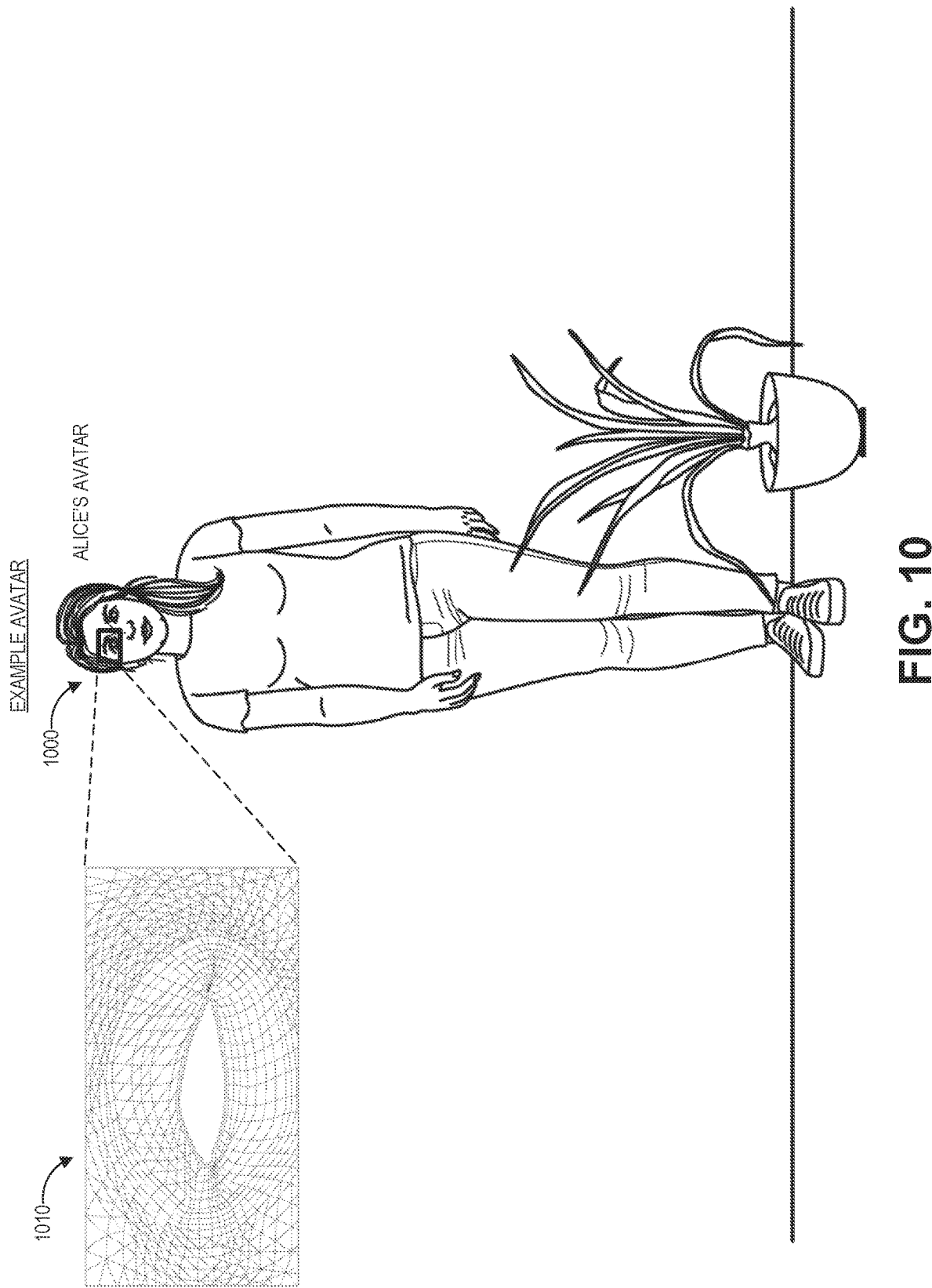
FIG. 10 illustrates an example of an avatar as perceived by a user of a wearable system.

FIG. 10 illustrates an example of an avatar as perceived by a user of a wearable system. The example avatar 1000 shown in FIG. 10 can be an avatar of Alice 912 (shown in FIG. 9B) standing behind a physical plant in a room. An avatar can include various characteristics, such as for example, size, appearance (e.g., skin color, complexion, hair style, clothes, facial features, such as wrinkles, moles, blemishes, pimples, dimples, etc.), position, orientation, movement, pose, expression, etc. These characteristics may be based on the user associated with the avatar (e.g., the avatar 1000 of Alice may have some or all characteristics of the actual person Alice 912). As further described herein, the avatar 1000 can be animated based on contextual information, which can include adjustments to one or more of the characteristics of the avatar 1000. Although generally described herein as representing the physical appearance of the person (e.g., Alice), this is for illustration and not limitation. Alice's avatar could represent the appearance of another real or fictional human being besides Alice, a personified object, a creature, or any other real or fictitious representation. Further, the plant in FIG. 10 need not be physical, but could be a virtual representation of a plant that is presented to the user by the wearable system. Also, additional or different virtual content than shown in FIG. 10 could be presented to the user.

Examples of Rigging Systems for Virtual Characters

An animated virtual character, such as a human avatar, can be wholly or partially represented in computer graphics as a polygon mesh. A polygon mesh, or simply "mesh" for short, is a collection of points in a modeled three-dimensional space. The mesh can form a polyhedral object whose surfaces define the body or shape of the virtual character (or a portion thereof). While meshes can include any number of points (within practical limits which may be imposed by available computing power), finer meshes with more points are generally able to portray more realistic virtual characters with finer details that may closely approximate real life people, animals, objects, etc. FIG. 10 shows an example of a mesh 1010 around an eye of the avatar 1000. While meshes can include any number of points (within practical limits which may be imposed by available computing power), finer meshes with more points are generally able to portray more realistic virtual characters with finer details that may closely approximate real life people, animals, objects, etc. FIG. 10 shows an example of a mesh 1010 around an eye of the avatar 1000. The mesh 1010 may be relatively fine (e.g., have a relatively large number of points), to facilitate a high quality simulation of the complex curves and movements that occur in the eye region.

Each point in the mesh can be defined by a coordinate in the modeled three-dimensional space. The modeled three-dimensional space can be, for example, a Cartesian space addressed by (x, y, z) coordinates. The points in the mesh are the vertices of the polygons which make up the polyhedral object. Each polygon represents a surface, or face, of the polyhedral object and is defined by an ordered set of vertices, with the sides of each polygon being straight line edges connecting the ordered set of vertices. In some cases, the polygon vertices in a mesh may differ from geometric polygons in that they are not necessarily coplanar in 3D graphics. In addition, the vertices of a polygon in a mesh may be collinear, in which case the polygon has zero area (referred to as a degenerate polygon).

In some embodiments, a mesh is made up of three-vertex polygons (i.e., triangles or "tris" for short) or four-vertex polygons (i.e., quadrilaterals or "quads" for short). However, higher-order polygons can also be used in some meshes. Meshes are typically quad-based in direct content creation (DCC) applications (e.g., applications such as Maya (available from Autodesk, Inc.) or Houdini (available from Side Effects Software Inc.) which are primarily designed for creating and manipulating 3D computer graphics), whereas meshes are typically tri-based in real-time applications.

To animate a virtual character, its mesh can be deformed by moving some or all of its vertices to new positions in space at various instants in time. The deformations can represent both large-scale movements (e.g., movement of limbs) and fine movements (e.g., facial movements). These and other deformations can be based on real-world models (e.g., photogrammetric scans of real humans performing body movements, articulations, facial contortions, expressions, etc.), art-directed development (which may be based on real-world sampling), combinations of the same, or other techniques. In the early days of computer graphics, mesh deformations could be accomplished manually by independently setting new positions for the vertices, but given the size and complexity of modern meshes it is typically desirable to produce deformations using automated systems and processes. The control systems, processes, and techniques for producing these deformations are referred to as rigging, or simply "the rig." The example avatar processing and rendering system 690 of FIG. 6B includes a 3D model processing system 680 which can implement rigging.

The rigging for a virtual character can use skeletal systems to assist with mesh deformations. A skeletal system includes a collection of joints which correspond to points of articulation for the mesh. In the context of rigging, joints are sometimes also referred to as "bones" despite the difference between these terms when used in the anatomical sense. Joints in a skeletal system can move, or otherwise change, with respect to one another according to transforms which can be applied to the joints. The transforms can include translations or rotations in space, as well as other operations. The joints can be assigned hierarchical relationships (e.g., parent-child relationships) with respect to one another. These hierarchical relationships can allow one joint to inherit transforms or other characteristics from another joint. For example, a child joint in a skeletal system can inherit a transform assigned to its parent joint so as to cause the child joint to move together with the parent joint.

A skeletal system for a virtual character can be defined with joints at appropriate positions, and with appropriate local axes of rotation, degrees of freedom, etc., to allow for a desired set of mesh deformations to be carried out. Once a skeletal system has been defined for a virtual character, each joint can be assigned, in a process called "skinning," an amount of influence over the various vertices in the mesh. This can be done by assigning a weight value to each vertex for each joint in the skeletal system. When a transform is applied to any given joint, the vertices under its influence can be moved, or otherwise altered, automatically based on that joint transform by amounts which can be dependent upon their respective weight values.

A rig can include multiple skeletal systems. One type of skeletal system is a core skeleton (also referred to as a low-order skeleton) which can be used to control large-scale movements of the virtual character. In the case of a human avatar, for example, the core skeleton might resemble the anatomical skeleton of a human. Although the core skeleton for rigging purposes may not map exactly to an anatomically-correct skeleton, it may have a sub-set of joints in analogous locations with analogous orientations and movement properties.

As briefly mentioned above, a skeletal system of joints can be hierarchical with, for example, parent-child relationships among joints. When a transform (e.g., a change in position and/or orientation) is applied to a particular joint in the skeletal system, the same transform can be applied to all other lower-level joints within the same hierarchy. In the case of a rig for a human avatar, for example, the core skeleton may include separate joints for the avatar's shoulder, elbow, and wrist. Among these, the shoulder joint may be assigned to the highest level in the hierarchy, while the elbow joint can be assigned as a child of the shoulder joint, and the wrist joint can be assigned as a child of the elbow joint. Accordingly, when a particular translation and/or rotation transform is applied to the shoulder joint, the same transform can also be applied to the elbow joint and the wrist joint such that they are translated and/or rotated in the same way as the shoulder.

Despite the connotations of its name, a skeletal system in a rig need not necessarily represent an anatomical skeleton. In rigging, skeletal systems can represent a wide variety of hierarchies used to control deformations of the mesh. For example, hair can be represented as a series of joints in a hierarchical chain; skin motions due to an avatar's facial contortions (Which may represent expressions such as smiling, frowning, laughing, speaking, blinking, etc.) can be represented by a series of facial joints controlled by a facial rig; muscle deformation can be modeled by joints; and motion of clothing can be represented by a grid of joints.

The rig for a virtual character can include multiple skeletal systems, some of which may drive the movement of others. A lower-order skeletal system is one which drives one or more higher-order skeletal systems. Conversely, higher-order skeletal systems are ones which are driven or controlled by a lower-order skeletal system. For example, whereas the movements of the core skeleton of a character might be controlled manually by an animator, the core skeleton can in turn drive or control the movements of a higher-order skeletal system. For example, higher-order helper joints—which may not have anatomical analogs in a physical skeleton—can be provided to improve the mesh deformations which result from movements of the core skeleton. The transforms applied to these and other joints in higher-order skeletal systems may be derived algorithmically from the transforms applied to the lower-order skeleton. Higher-order skeletons can represent, for example, muscles, skin, fat, clothing, hair, or any other skeletal system which does not require direct animation control.

As already discussed, transforms can be applied to joints in skeletal systems in order to carry out mesh deformations. In the context of rigging, transforms include functions which accept one or more given points in 3D space and produce an output of one or more new 3D points. For example, a transform can accept one or more 3D points which define a joint and can output one or more new 3D points which specify the transformed joint. Joint transforms can include, for example, a translation component, a rotation component, and a scale component.

A translation is a transform which moves a set of one or more specified points in the modeled 3D space by a specified amount with no change in the orientation or size of the set of points. A rotation is a transform which rotates a set of one or more specified points in the modeled 3D space about a specified axis by a specified amount (e.g., rotate every point in the mesh 45 degrees about the z-axis). An affine transform (or 6 degree of freedom (DOF) transform) is one which only includes translation(s) and rotation(s). Application of an affine transform can be thought of as moving a set of one or more points in space without changing its size, though the orientation can change.

Meanwhile, a scale transform is one which modifies one or more specified points in the modeled 3D space by scaling their respective coordinates by a specified value. This changes the size and/or shape of the transformed set of points. A uniform scale transform scales each coordinate by the same amount, whereas a non-uniform scale transform can scale the (x, y, z) coordinates of the specified points independently. A non-uniform scale transform can be used, for example, to provide squashing and stretching effects, such as those which may result from muscular action. Yet another type of transform is a shear transform. A shear transform is one which modifies a set of one or more specified points in the modeled 3D space by translating a coordinate of the points by different amounts based on the distance of that coordinate from an axis.

When a transform is applied to a joint to cause it to move, the vertices under the influence of that joint are also moved. This results in deformations of the mesh. As discussed above, the process of assigning weights to quantify the influence each joint has over each vertex is called skinning (or sometimes "weight painting" or "skin weighting"). The weights are typically values between 0 (meaning no influence) and 1 (meaning complete influence). Some vertices in the mesh may be influenced only by a single joint. In that case those vertices are assigned weight values of 1 for that joint, and their positions are changed based on transforms assigned to that specific joint but no others. Other vertices in the mesh may be influenced by multiple joints. In that case, separate weights are assigned to those vertices for all of the influencing joints, with the sum of the weights for each vertex equaling 1. The positions of these vertices are changed based on transforms assigned to all of their influencing joints.

Making weight assignments for all of the vertices in a mesh can be extremely labor intensive, especially as the number of joints increases. Balancing the weights to achieve desired mesh deformations in response to transforms applied to the joints can be quite difficult for even highly trained artists. In the case of real-time applications, the task can be complicated further by the fact that many real-time systems also enforce limits on the number of joints (generally 8 or fewer) which can be weighted to a specific vertex. Such limits are typically imposed for the sake of efficiency in the graphics processing unit (GPU).

The term skinning also refers to the process of actually deforming the mesh, using the assigned weights, based on transforms applied to the joints in a skeletal system. For example, a series of core skeleton joint transforms may be specified by an animator to produce a desired character movement (e.g., a running movement or a dance step). When transforms are applied to one or more of the joints, new positions are calculated for the vertices under the influence of the transformed joints. The new position for any given vertex is typically computed as a weighted average of all the joint transforms which influence that particular vertex. There are many algorithms used for computing this weighted average, but the most common, and the one used in most real-time applications due to its simplicity and ease of control, is linear blend skinning (LBS). In linear blend skinning, a new position for each vertex is calculated using each joint transform for which that vertex has a non-zero weight. Then, the new vertex coordinates resulting from each of these joint transforms are summed in proportion to the respective weights assigned to that vertex for each of the joints. There are well known limitations to LBS in practice, and much of the work in making high-quality rigs (e.g., for movies) is devoted to finding and overcoming these limitations. Many helper joint systems are designed specifically for this purpose.

In addition to skeletal systems, "blendshapes" can also be used in rigging to produce mesh deformations. A blendshape (sometimes also called a "morph target" or just a "shape") is a deformation applied to a set of vertices in the mesh where each vertex in the set is moved a specified amount in a specified direction based upon a weight. Each vertex in the set may have its own custom motion for a specific blendshape, and moving the vertices in the set simultaneously will generate the desired shape. The custom motion for each vertex in a blendshape can be specified by a "delta," which is a vector representing the amount and direction of XYZ motion applied to that vertex. Blendshapes can be used to produce, for example, facial deformations to move the eyes, lips, brows, nose, dimples, etc., just to name a few possibilities.

Blendshapes are useful for deforming the mesh in an art-directable way. They offer a great deal of control, as the exact shape can be sculpted or captured from a scan of a model. But the benefits of blendshapes come at the cost of having to store the deltas for all the vertices in the blendshape. For animated characters with fine meshes and many blendshapes, the amount of delta data can be significant.

Each blendshape can be applied to a specified degree by using blendshape weights. These weights typically range from 0 (where the blendshape is not applied at all) to 1 (where the blendshape is fully active). For example, a blendshape to move a character's eyes can be applied with a small weight to move the eyes a small amount, or it can be applied with a large weight to create a larger eye movement.

The rig may apply multiple blendshapes in combinations with one another to achieve a desired complex deformation. For example, to produce a smile, the rig may apply blendshapes for lip corner pull, raising the upper lip, and lowering the lower lip, as well as moving the eyes, brows, nose, and dimples. The desired shape from combining two or more blendshapes is known as a combination shape (or simply a "combo").

One problem that can result from applying two blendshapes in combination is that the blendshapes may operate on some of the same vertices. When both blendshapes are active, the result is called a double transform or "going off-model." The solution to this is typically a corrective blendshape. A corrective blendshape is a special blendshape which represents a desired deformation with respect to a currently applied deformation rather than representing a desired deformation with respect to the neutral. Corrective blendshapes (or just "correctives") can be applied based upon the weights of the blendshapes they are correcting. For example, the weight for the corrective blendshape can be made proportionate to the weights of the underlying blendshapes which trigger application of the corrective blendshape.

Corrective blendshapes can also be used to correct skinning anomalies or to improve the quality of a deformation. For example, a joint may represent the motion of a specific muscle, but as a single transform it cannot represent all the non-linear behaviors of the skin, fat, and muscle. Applying a corrective, or a series of correctives, as the muscle activates can result in more pleasing and convincing deformations.

Rigs are built in layers, with lower, simpler layers often driving higher-order layers. This applies to both skeletal systems and blendshape deformations. For example, as already mentioned, the rigging for an animated virtual character may include higher-order skeletal systems which are controlled by lower-order skeletal systems. There are many ways to control a higher-order skeleton or a blendshape based upon a lower-order skeleton, including constraints, logic systems, and pose-based deformation.

A constraint is typically a system where a particular object or joint transform controls one or more components of a transform applied to another joint or object. There are many different types of constraints. For example, aim constraints change the rotation of the target transform to point in specific directions or at specific objects. Parent constraints act as virtual parent-child relationships between pairs of transforms. Position constraints constrain a transform to specific points or a specific object. Orientation constraints constrain a transform to a specific rotation of an object. Additional discussion of constraints that can be used in embodiments of the disclosed joint decompositions is provided below.

Logic systems are systems of mathematical equations which produce some outputs given a set of inputs. These are specified, not learned. For example, a blendshape value might be defined as the product of two other blendshapes (this is an example of a corrective shape known as a combination or combo shape).

Pose-based deformations can also be used to control higher-order skeletal systems or blendshapes. The pose of a skeletal system is defined by the collection of transforms (e.g., rotation(s) and translation(s)) for all the joints in that skeletal system. Poses can also be defined for subsets of the joints in a skeletal system. For example, an arm pose could be defined by the transforms applied to the shoulder, elbow, and wrist joints. A pose space deformer (PSD) is a system used to determine a deformation output for a particular pose based on one or more "distances" between that pose and a defined pose. These distances can be metrics which characterize how different one of the poses is from the other. A PSD can include a pose interpolation node which, for example, accepts a set of joint rotations (defining a pose) as input parameters and in turn outputs normalized per-pose weights to drive a deformer, such as a blendshape. The pose interpolation node can be implemented in a variety of ways, including with radial basis functions (RBFs). RBFs can perform a machine-learned mathematical approximation of a function. RBFs can be trained using a set of inputs and their associated expected outputs. The training data could be, for example, multiple sets of joint transforms (which define particular poses) and the corresponding blendshapes (or linear skins) to be applied in response to those poses. Once the function is learned, new inputs (e.g., poses) can be given and their expected outputs can be computed efficiently. RBFs are a subtype of artificial neural networks. RBFs can be used to drive higher-level components of a rig based upon the state of lower-level components. For example, the pose of a core skeleton can drive helper joints and correctives at higher levels.

These control systems can be chained together to perform complex behaviors. As an example, an eye rig could contain two "look around" values for horizontal and vertical rotation. These values can be passed through some logic to determine the exact rotation of an eye joint transform, which might in turn be used as an input to an RBF which controls blendshapes that change the shape of the eyelid to match the position of the eye. The activation values of these shapes might be used to drive other components of a facial expression using additional logic, and so on.

A goal of rigging systems is typically to provide a mechanism to produce pleasing, high-fidelity deformations based on simple, human-understandable control systems. In the case of real-time applications, the goal is typically to provide rigging systems which are simple enough to run in real-time on, for example, a VR/AR/MR system 200, while making as few compromises to the final quality as possible. In some embodiments, the 3D model processing system 680 executes a rigging system to animate an avatar in a mixed reality environment 100 in real-time to be interactive (with users of the VR/AR/MR system) and to provide appropriate, contextual avatar behavior (e.g., intent-based behavior) in the user's environment.

Introduction to Animation of a Virtual Avatar Using a Markov Decision Process (MDP)

Embodiments of systems and methods are provided that allow a virtual character to locomote through a real or virtual space using a library of animation clips without having to perform an exhaustive search through a large database of animation clips at runtime. Each of the animation clips is an animation of the avatar performing an action that can be used to locomote the avatar. For bipedal (e.g., human) avatars, the animation clips can include any type of bipedal movement or the avatar performing a pose (e.g., standing still and facing in a specific direction or orientation). For example, the action may be standing still, sitting down, getting up, walking, running, hopping, jumping, side-stepping, slithering, performing cartwheels, flying, and so forth. Likewise, for animals or any other type of virtual character, the animation clips can animate any type of positioning or movement. In some embodiments, an animation clip of motion can be a sampling of the avatar's rigging parameters (e.g., joints in a skeleton and rotation or translation parameters for these joints). A clip can include a sequence of frames and can be annotated with information such as a descriptive label for the motion represented in the clip (e.g., "walking", "jumping", "turning clockwise") or constraints on the motion (e.g., "heels planted" for a "shuffling" motion). The animation clips can be stored in a non-transitory data repository such as, e.g., the remote data repository 980 described with reference to FIG. 9A or the remote data repository 280 described with reference to FIG. 2.

The systems and methods can generate a continuous stream of avatar locomotion by computationally selecting and combining sequences of the animation clips to synthesize movement of the avatar from an initial position and pose to a final position and pose in a 2D or 3D environment. The systems and methods can be implemented by a hardware processor such as, e.g., the remote processing module 970 described with reference to FIG. 9A or the remote processing module 270 described with reference to FIG. 2.

As will be further described below, the systems and methods can utilize a Markov decision process (MDP) to determine a best choice for the next move of the avatar. These systems and methods can pre-calculate these moves using an MDP control policy (sometimes referred to just as the policy, for short), which advantageously offloads the computationally time-consuming movement calculations from a real-time animation engine used to render the locomotion of the avatar (e.g., the avatar processing and rendering system 690 described with reference to FIG. 6B).

Avatar movement can be synthesized without having to know the physics of the avatar, because the motion may be completely derived from the animation clips. Thus, certain such embodiments may not need to know about footsteps or weight and balance, etc. Being completely derived from animation also means that certain such methods can apply to any type of locomotion from, e.g., hopping to bipedal ambulation to slithering to cartwheels. Some such embodiments may be specialized to 2D movement that is constrained to a ground plane, whereas other embodiments can extend to 3D movements (e.g., to permit flying through a 3D space).

Certain embodiments of the systems and methods may reduce or prevent foot slide, because motion of the avatar matches the motion from the animation clips. Foot slide can occur when the overall motion of the avatar does not tie exactly to the footsteps, which can give the avatar an appearance of motion like ice skating. Foot slide reduces presence and object permanence because the character acts unnaturally.

Standard path planning techniques can be used to map out navigational areas in the environment and to provide an overall path for the avatar. For example, navigation mesh (navmesh) path planning can be used, possibly with limitations placed on the number or size of convex polygons (e.g., obtuse triangles) in the navmesh. Navmesh path planning can determine a traversable path for the avatar (e.g., one that avoids obstacles or fail states (e.g., falling off of a cliff) in the environment) by identifying a corridor, which is an ordered list of navigable polygons in the navmesh.

Figure 11:
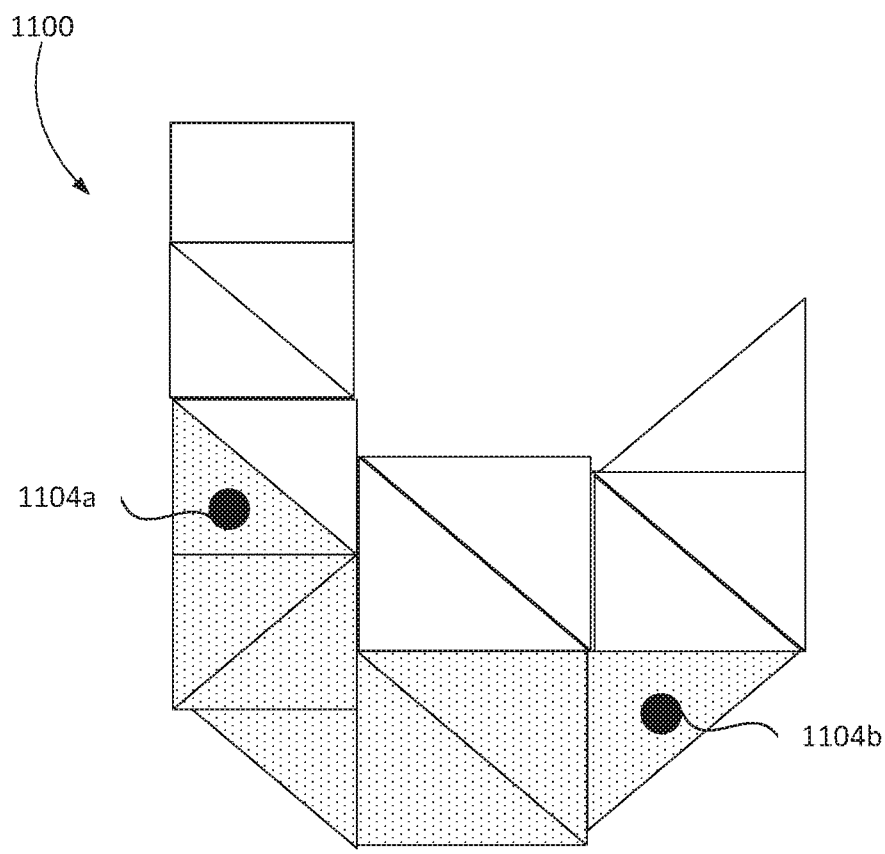
FIG. 11 illustrates an example of a navigation mesh (also referred to as a navmesh) showing traversable areas in an environment.

FIG. 11 illustrates an example navmesh 1100 showing traversable areas in an environment. The traversable areas can be mapped out by a game designer or in AR/MR by the wearable system using the object recognizers 708 described with reference to FIG. 7. The navmesh can comprise polygons (e.g., triangles and squares in this example). The sequence of polygons that include a starting position 1104a and a final position 1104b (sometimes referred to as the destination or goal) is the corridor and is shown via cross-hatch in FIG. 11. The corridor can be identified using navigation path techniques such as the A* or Dijkstra methods. The animation engine can move the avatar along the corridor from the starting position 1104a to the final position 1104b by steering the avatar towards the next visible corner (e.g., vertex of a polygon) of the corridor. The pathfinding technique generally does not need to have information about how the avatar moves (e.g., walks, crawls, hops, slithers, etc.) to determine the corridor in the navmesh.

A motion graph can be used to animate the avatar along the path in the corridor. The motion graph provides a selection of the animation clips to move the avatar from an initial state (e.g., initial position and initial pose) to a destination state (e.g., destination position and destination pose).

Figure 12:
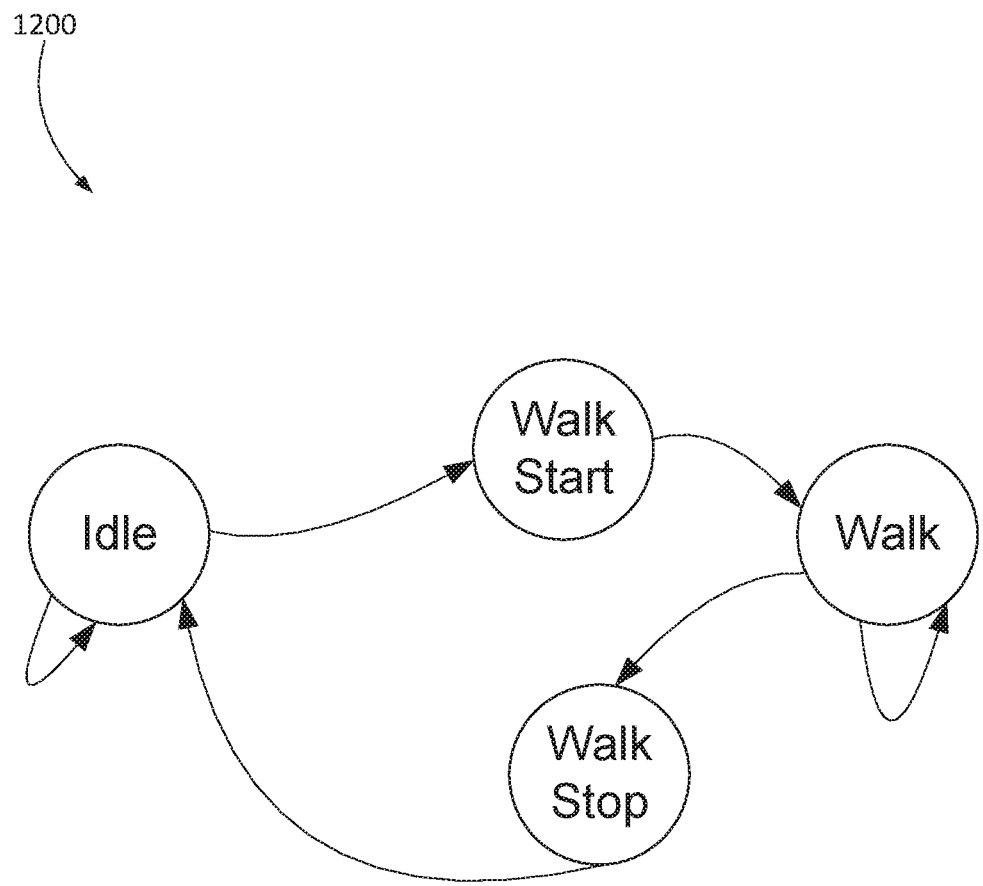

FIG. 12 illustrates an example of a motion graph 1200, which shows a variety of states an avatar can transition between. For example, the avatar can be idle (and remain in that state). From Idle, the avatar can transition to a Walk Start state and then further transition to a Walk state (and can remain in the Walk state while walking). The avatar can transition from the Walk state to a Walk Stop state and then return to Idle.

At runtime, the system can start with the avatar's initial position, and calculate a new position corresponding to each of the animations in the library of animation clips. The system can choose the animation that gets the avatar closest to the desired destination state. Once the new position is calculated, the system repeats the process by calculating a second new position for each animation and can choose the animation that gets closest to the desired end state. The process repeats until the avatar ends up at the destination state. The output of the process (e.g., the motion graph) is a set of animations the avatar needs to take to get from point A to point B (e.g. A1, A6, A2, A2, A4, where A stands for Animation and the number represents a particular animation clip). The entire animation sequence is calculated all at once, so if something in the real world changes (e.g., resulting in a new desired destination state), the entire animation sequence has to start over at the beginning and be recalculated, which is computationally intensive and takes time. The entire sequence has to be calculated using the motion graph method, so the avatar does not end up at a fail state (e.g. hit a wall or fall off of a cliff). A fail state includes any state an avatar passes through that results in the avatar never reaching a desired destination state.

To reduce or avoid some of the challenges with animating an avatar using a motion graph, embodiments of the systems and methods described herein can additionally or alternatively use a Markov decision process (MDP). MDP provides a framework for decision making in situations where outcomes are partially random (e.g., determined probabilistically). MDP can generate a control policy, which is a function that specifies an action to take when the avatar is in a particular state. The control policy can be based on a set of rewards or punishments (e.g., punishments are rewards with negative values) associated with various actions that can occur in each state. For example, movement in a desired direction along the corridor may be associated with a positive reward whereas movement into a wall or off of a cliff may be associated with a punishment. MDP can also utilize a discount factor, which discounts future rewards or punishments relative to present rewards or punishments.

Figure 13:
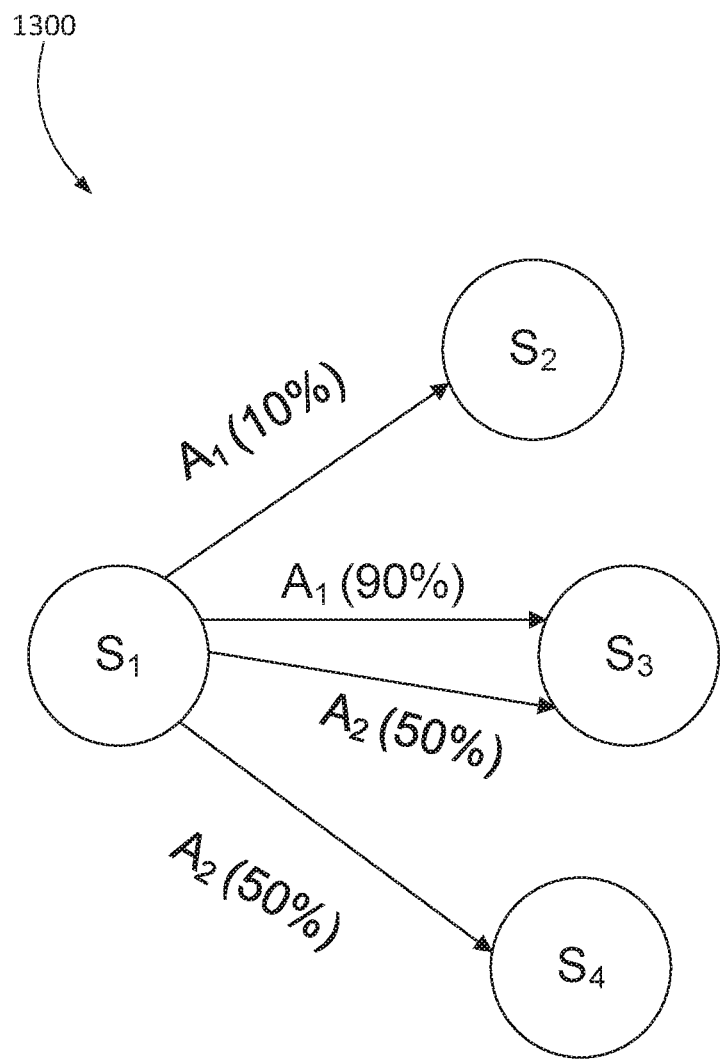
FIG. 13 illustrates an example of a Markov decision process with four states, $S_1$, $S_2$, $S_3$, and $S_4$ and two actions $A_1$ and $A_2$.

FIG. 13 illustrates an example of an MDP 1300 with four states, $S_1$, $S_2$, $S_3$, and $S_4$. An action can cause the state to transition to a different state with a particular probability. In this example, an action $A_1$ will lead to state $S_2$ with 10% probability and to state $S_3$ with 90% probability. An action $A_2$ will lead to state $S_3$ with 50% probability and to state $S_4$ with 50% probability. If the avatar is at state $S_1$ and the goal is to transition to state $S_3$, FIG. 13 shows that the avatar should take the action $A_1$, because there is a 90% probability of reaching the state $S_3$ with the action $A_1$ and only a 50% probability of reaching the state $S_3$ with the action $A_2$. As noted above, rewards or punishments can be associated with the actions, and the MDP control policy can be set based not only on the transition probabilities among the states but also the rewards that occur if the actions taken result in particular states. For example, if the state $S_2$ is associated with a punishment (say, −200), the state $S_3$ is associated with a reward (say, +10), and the state $S_4$ is neutral (e.g., no reward or punishment), the MDP control policy might select the action $A_2$ (rather than the action $A_1$ from the preceding example), due to the large punishment that occurs if the action $A_1$ is performed and, due to the transition probabilities, results in the state $S_2$. Note that the numerical probability values in FIG. 13 are merely examples. Further details regarding how to calculate transition probabilities are described with reference to FIG. 15 (e.g., MDP block 1516).

Given a set of states, actions, rewards, transition probabilities, and discounts, the MDP framework can generate a control policy that specifies the optimal action to be taken when in a particular state. The MDP control policy can be determined, e.g., by using linear or dynamic programming techniques, value iteration (e.g., backward induction), or policy iteration. If the transition probabilities are unknown, replacement learning algorithms can be used to find the control policy. The control policy can be calculated offline and then applied at runtime to move the avatar.

Terminology

In the context of avatar animation, the MDP control policy can be used to select the sequence of animation clips that is used to move the avatar from an initial state to a destination state along a corridor in a navmesh. In the following description, movement in a 2D environment will be presumed for illustrative purpose, although this is not a limitation, as the MDP techniques can be applied to movement in a 3D environment.

The parameterization of the policy state space S used for the MDP analysis is a physical state space $S_p$ and an animation state space $S_a$. The full policy state space S is the product of the physical and animation state spaces: $S_p \cdot S_a$. The total number of policy states is the number of physical states in the physical state space multiplied by the number of states in the animation state space.

Figure 14:
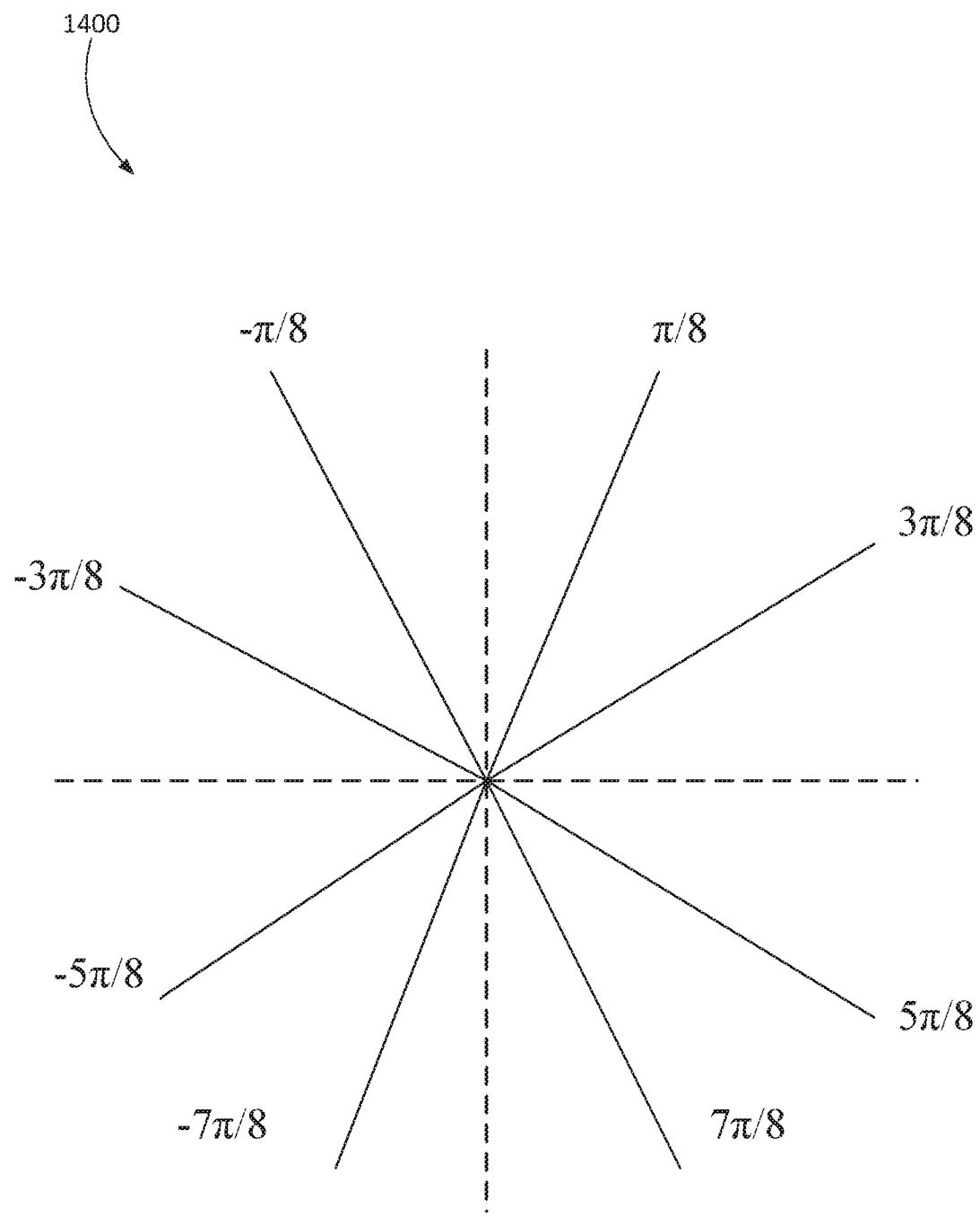
FIG. 14 illustrates a rotational space having eight rotation states.

The physical state space $S_p$ in which the avatar moves can have two parts: a 2D linear state space for linear translations of the avatar and a rotational state space for angular rotations of the avatar. The 2D translational state space can be defined by partitioning the physical environment into a grid of cells. Any number of cells can be used. The location of each cell can be specified with, e.g., Cartesian x and y coordinates, although any other suitable coordinate system, or any other label for two orthogonally intersecting axes, can be used. The rotational state space may be discretized so that the avatar can be oriented in a finite number of directions within each cell. FIG. 14 illustrates an example of a rotational space 1400 with eight rotational states (at angles R=±π/8, ±3π/8, ±5π/8, and ±7π/8) although any number of rotational states can be used. The number of physical states in the physical state space $S_p$ is the number of rotational states multiplied by the number of cells. A physical state can be identified by the ordered triple (x, y, R).

The animation state space $S_a$ can correspond to the states of a motion graph (described above). A state in the animation state space can exist for each frame of animation in the animation clips used to generate the motion graph. In other implementations described further below, a state in the animation state space may exist only for each animation blend point, which may increase efficiency. The motion graph can be generated manually or automatically from the library of animation clips. For example, a motion graph can be formed using transitions between frames of the animation clips as edges of a directed graph. Nodes in the graph represent sequences of frames extending between transitions. As an example, a motion graph can be generated by analyzing the animation clips and identifying temporal windows of frames having a similar pose and constructing smooth transitions between them, for example, by spherical linear interpolation of joint rotations of a skeleton.

An animation blend point (BP) can be used to represent a particular orientation and velocity of the different parts of the avatar. A BP can be a single frame of an animation (e.g., a pose with velocity), with a velocity associated with each part of the avatar skeleton (e.g., it has a position and a tangent associated with each joint of a skeleton). If the tangent does not match in the next animation (even if the positions match), what is known as a "pop" can occur, which is an abrupt movement change that looks unnatural. Preferably, the BP includes first and second derivatives (e.g., velocity and acceleration) for each joint. Blend points can be stored in the animation clips.

In some implementations, animation tags can be used, additionally or alternatively to BPs. An animation tag can be a pose of the avatar at any point or frame within an animation clip, whereas a BP typically represents the pose of the avatar at an endpoint of an animation clip. For example, a walk tag may represent points or frames in the animation clip where the avatar is walking, whereas a BP may represent an endpoint of the frame where the avatar is walking in a direction (e.g., walking straight).

Tags can be used differently from BPs, BPs can be used in the generation of animation states. BPs can signify when it is possible for one animation to jump to another animation. Generally, this is a single frame of an animation clip. Tags can be used in the designation of MDP states as goal states. Tags can signify, in combination with other goal state conditions, when the states that are assigned goal rewards. A tag can be assigned to a range of frames of an animation clip (e.g., a range of frames where the avatar is walking straight).

With reference to the motion graph 1200 in FIG. 12, a blend point BP1 can represent the avatar before and after Idle, because the animation clip starts and ends in the same state (e.g., pose and orientation/velocity). In contrast, the Walk Start state can be represented by a first blend point BP1 at the beginning, and a second blend point BP2 at the end, since the animation clip has a different beginning pose and orientation/velocity compared to the end state.

In some implementations, each state in the state space S comprises a current animation blend point $B_p$ and a physical position in the physical state space of the environment: ($B_p$, $w_p$) where $w_p=(x, y, R)$. Transitions from states in the physical state space $S_p$ are based on the avatar's motion and are probabilistic. Actions from states in the animation state space $S_a$ are based on the natural flow of the animation from one frame to the next and the inter-animation transitions in the motion graph.

Additionally or alternatively to a BP, the state space can comprise an animation tag, e.g., for goal states. If a state is found to match goal requirements (e.g., position, rotation, or animation tag), the system can drop back into a mode where the system expands the frames of the animation that match the tag to a mode where each of those frames is in the state space.

Continuing with the preceding example, where the goal was for the avatar to move from BP1 to BP2, the present example now additionally includes a physical state position requirement that indicates the avatar needs to move behind itself to get to the desired end point. There are a set number of actions that satisfy the BP1 to BP2 requirement (e.g., walk start forward, walk start left, walk start backwards, etc.), but only one which also satisfies the physical requirement, walk start backwards.

States in the state space can be classified as goal states (also referred to as end states or destination states) to indicate a final desired physical position, orientation, or tag of the avatar. States in the state space can also be classified as fail states (e.g., the avatar running into a wall or falling off of a cliff).

The systems and methods can apply an MDP framework to calculate a control policy that identifies the best action for the avatar to take in a motion sequence. For example, the policy can comprise a table that has a start state, and the single best corresponding action to take in order to move the avatar closer or closest to the policy end/goal state. The policy can include a probability that the avatar will reach the end state of the policy. The probability can be pre-calculated.

To get to the policy end state, one or more actions may need to be performed, depending on how close to the start state the avatar is in or how close the action can move the avatar to the end state. Accordingly, the systems and methods may perform one or more policy iterations to reach the end state. The policy can be calculated with a specific end goal, so that the end goal is built into the policy directly. For example, the policy can contain a set of states located in a local map that the avatar may go through in order to get to the desired end goal (e.g., a set of possible states to go from a first point to a second point). The MDP policy, in effect, answers the question: for a current state, what is the best action to take to move the avatar closer to the goal state?

A policy may include any number of goal states. As discussed above, the policy can be pre-calculated so that the policy is available at runtime, which greatly speeds up the ability of the runtime engine (e.g., the avatar animation of the avatar processing and rendering system 690) to animate movement of the avatar in real time.

Accordingly, an avatar can be moved from point to point in an environment by performing the following actions, in some embodiments. The real world environment of the avatar is mapped to identify and tag obstacles, fail states (e.g., walls or cliffs), traversable areas and so forth. This environmental information can be stored in the map 620 described with reference to FIG. 6A. A wearable device can use object recognizers to identify these features of the environment as described with reference to FIGS. 7 and 8. The wearable system can obtain the current, starting position and orientation of the avatar and identify a desired end position and orientation of the avatar. The wearable system can calculate a navigation path (navpath) through the environment (e.g., by finding a corridor in a navmesh). The wearable system can select a control policy, lay down the selected control policy, and execute the policy so that the avatar moves to a new position. The preceding actions can be repeated until the end/goal state is reached by the avatar. An example of this runtime process is described below with reference to FIGS. 18A-18M and FIG. 20.

Examples of Systems and Methods for Generating an MDP Policy

Figure 15:
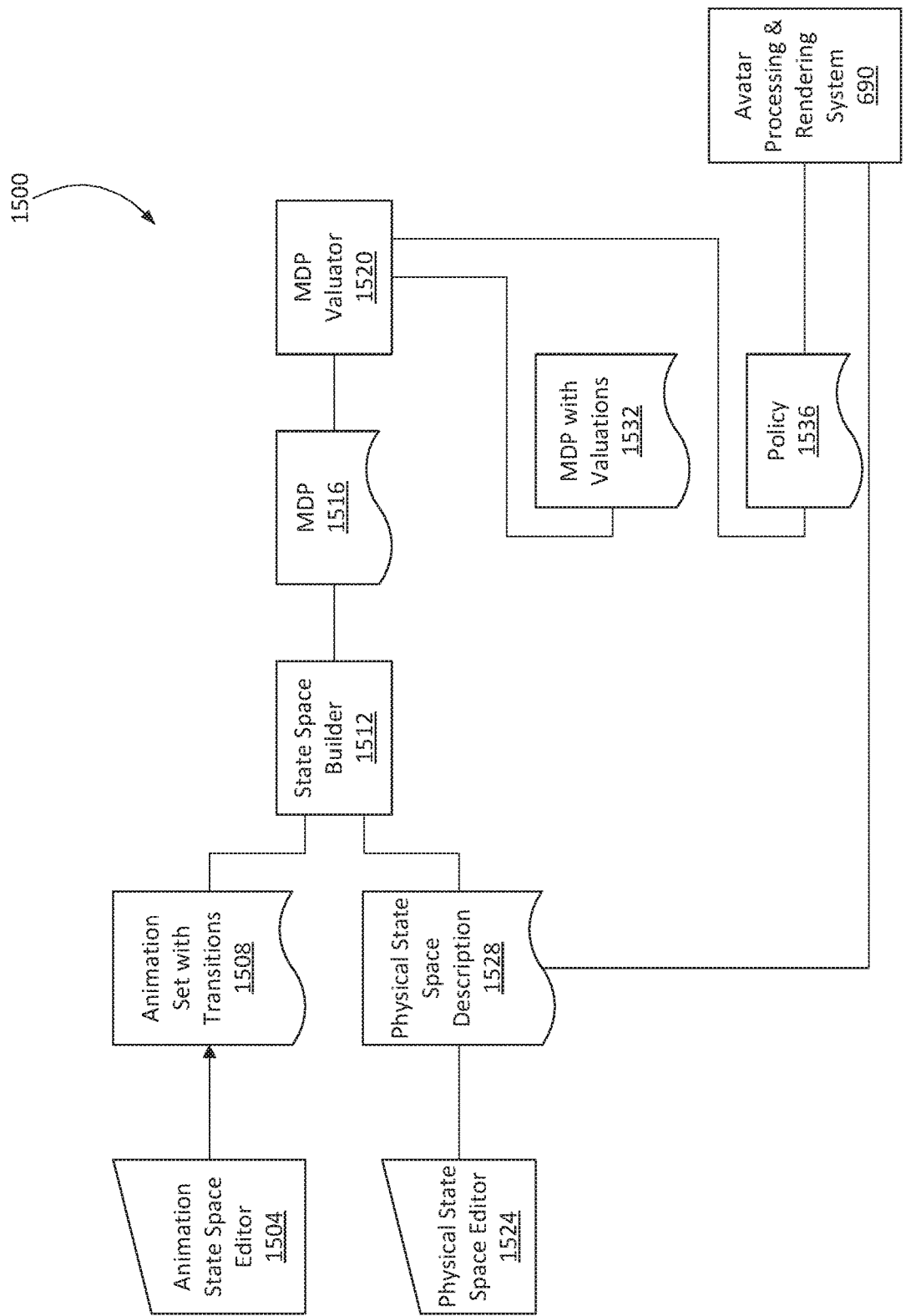
FIG. 15 is a diagram that illustrates an example process flow for generating a control policy for moving an avatar.

FIG. 15 is a process flow diagram that illustrates an example process flow 1500 for generating a control policy for moving an avatar. The process flow 1500 can be implemented, for example, by the remote processing module 270 of FIG. 2 or the remote computing system 920 of FIG. 9A, other suitable hardware computing device(s), or combinations of these and other computing devices. The results of the process flow 1500 (e.g., MDP policies, state space descriptions, etc.) can be communicated to the wearable system 200 and, for example, stored by the local data processing module 260. In other implementations, the process flow 1500 can be performed by the local processing and data module 260, for example, in an offline mode.

The example process flow 1500 shown in FIG. 15 is intended to be illustrative and not limiting. Process blocks can be merged, split, or have additional or different functionality, and interconnections among the process blocks can be different from that shown in FIG. 15. In some implementations, each block in the process flow 1500 is a separate process, which can take inputs, provide outputs, and save its internal processing space, data, and parameters (e.g., as a data file in non-transitory storage).

The example process flow 1500 starts with an animation state space editor 1504 that can be used to build and edit avatars, digital content, or AR/VR/MR or gaining environments. The animation state space editor 1504 can create the animation state space $S_a$ inputs used by a state space builder 1512 described below. In some implementations, the process flow 1500 can accept inputs from a human animator who is developing the AR/MR/VR world.

The animation state space editor 1504 can generate an animation set with transitions 1508. The animation editor 1504 can use the library of animation clips or the blend points (BPs) (which can be different from the number of animation clips because some animations have one or more common BPs). The animation editor 1504 can calculate changes (e.g., deltas) in position and rotation of the avatar from frame to frame (e.g., delta x, delta y, delta R) used to calculate the transition probabilities (see, e.g., the description of probabilities with reference to FIG. 16 below). An animation clip (or BP) can be considered a fail if any frame (or BP) in the animation clip goes through a fail state, which may be called going off policy.

The animation space editor 1504 can optionally perform an error check hash of the animation clips. For example, if an animation clip is edited, the hash will change upon edit so the animation space editor can determine whether the dependent calculations need to be re-run.

A physical state space editor 1524 can generate a description 1528 of the physical state space $S_p$. For example, the physical state space editor 1524 can generate the cells of the mesh used for the environment: the total number of x cells, the total number of y cells, a size of each cell, goal cell designations, fail cell designations, and the number of rotations R allowed within each cell (see, e.g., the rotation state 1400 shown in FIG. 14). Physical state space data that is typically not used during the MDP policy calculations (e.g., cell size) can be passed to the avatar processing and rendering system 690.

The state space builder 1512 builds the entire state space S from the animation state space data $S_a$ 1508 received from the animation state space editor 1504 and the physical state space data $S_p$ 1528 received from the physical state space editor 1524. For example, the state space S can include BPs (and/or animation tags) at each coordinate $w_p=(x, y, R)$ of the physical state space.

The state space builder 1512 can set up policies having a predefined number of x cells, y cells, number of rotations R per cell, a desired goal state (or multiple goal states), etc. A goal state (also referred to as an end state or simply as a goal) can include a BP or animation tag specifying what motions are acceptable. Using tags for the goal states can be advantageous. For example, a tag can be a pose at any point or frame during an animation clip that passes through the goal state, whereas a BP can be a pose at the end of the animation clip. A potential disadvantage of using BPs is that they can be very specific and it may be challenging to find an animation sequence that happens to end in the goal state. The animation clip may end after the goal state (e.g., overshooting may occur). If overshoot is acceptable, tags can be used, whereas if overshoot is not acceptable, BPs can be used. As an example, consider a goal that is to have the avatar walk straight ahead at the end of the policy. If an animation clip is tagged with a walk tag, it may not matter to the system whether the clip ends in the goal state, since the goal is to have the avatar walking straight at the end of the policy. In this example, a walk tag may be sufficient and is computationally simpler than using a walk straight BP.

The state space is passed to MDP block 1516. As described herein, MDP can utilize rewards or punishments to identify an optimal control policy. For example, if the avatar reaches the goal, a reward is given (e.g., a positive number). If the avatar fails to reach the goal, a punishment is given (e.g., a negative number, that is, a punishment is just a negative reward). Rewards (or punishments) that occur farther out (toward a final horizon) can be discounted compared to rewards (or punishments) that occur sooner. Thus, rewards that occur sooner are more valuable (and punishments more costly) than rewards (or punishments) that occur closer to the horizon. Use of discounts advantageously can provide that fewer animations are needed to reach a goal and tends to prevent the avatar wandering around for long times within the environment. As will be described below, an MDP valuator 1520 can iterate many times over a policy with rewards, punishments, and discounts to determine an improved or optimal control policy.

MDP is state based (e.g., using states from the state space builder 1512). As described above, since the state space includes the animation state space $S_a$, the MDP process will act on BPs or animation tags associated with the animation clips. Typically, the lengths of the different animation clips in the library of animation clips will be different from each other. Due to the variability in the length of the clips, BPs will tend to occur a variable amount of time from each other. Accordingly, some embodiments of the process flow 1500 factor in clip length into the MDP system of rewards, punishments, or discounts. As an example, a larger discount may be applied to a longer animation clip (e.g., a 3 second clip is assigned a bigger discount than a ¼ second clip).

Discounting can be applied so that rewards achieved farther in the future are worth less than rewards achieved in the near future. Discounting is a factor that allows a balance between performing actions in a fast and risky manner now that has less probability of paying off as compared to performing actions in a safe manner for a longer time that has a higher probability of paying off. For example, without discounting, an avatar might take baby steps as opposed to starting to run. Baby steps are slow, but the chances of hitting the goal state are higher. Running is fast but the avatar might take a misstep and miss the goal.

Animation clip length can be factored into the reward, punishment, or discount, which tends to keep the rewards, punishments, or discounts consistent in time. The clip length (e.g., a distance in time from a first BP to a second BP) advantageously can be used with the discount, because time is variable and discounts may only be applied at BPs.

An example of animation clips and BPs for an avatar starting to walk forward from idle, and then walking ½ step forward and then backward is provided in Table 1.

TABLE 1

| Start BP | Animation Clip | End BP |
|---|---|---|
| BP1 | Idle | BP1 |
| BP1 | Start Walk | BP2 |
| BP2 | Walk forward | BP2 |
| BP2 | End walk | BP1 |
| BP2 | Walk ½ step forward | BP2 |
| BP3 | Walk backward | BP3 |
| BP1 | Start walk backward | BP3 |

The state space builder 1512 can calculate, for a given animation, a probability that the avatar moves from state A to state B. Any suitable technique for MDP probability calculations can be used. These MDP probabilities 1516 are used by the MDP valuator 1520 described below. Two example techniques for calculating state transition probabilities are described below.

Example System of Equations for State Transition Probabilities

Figure 16:
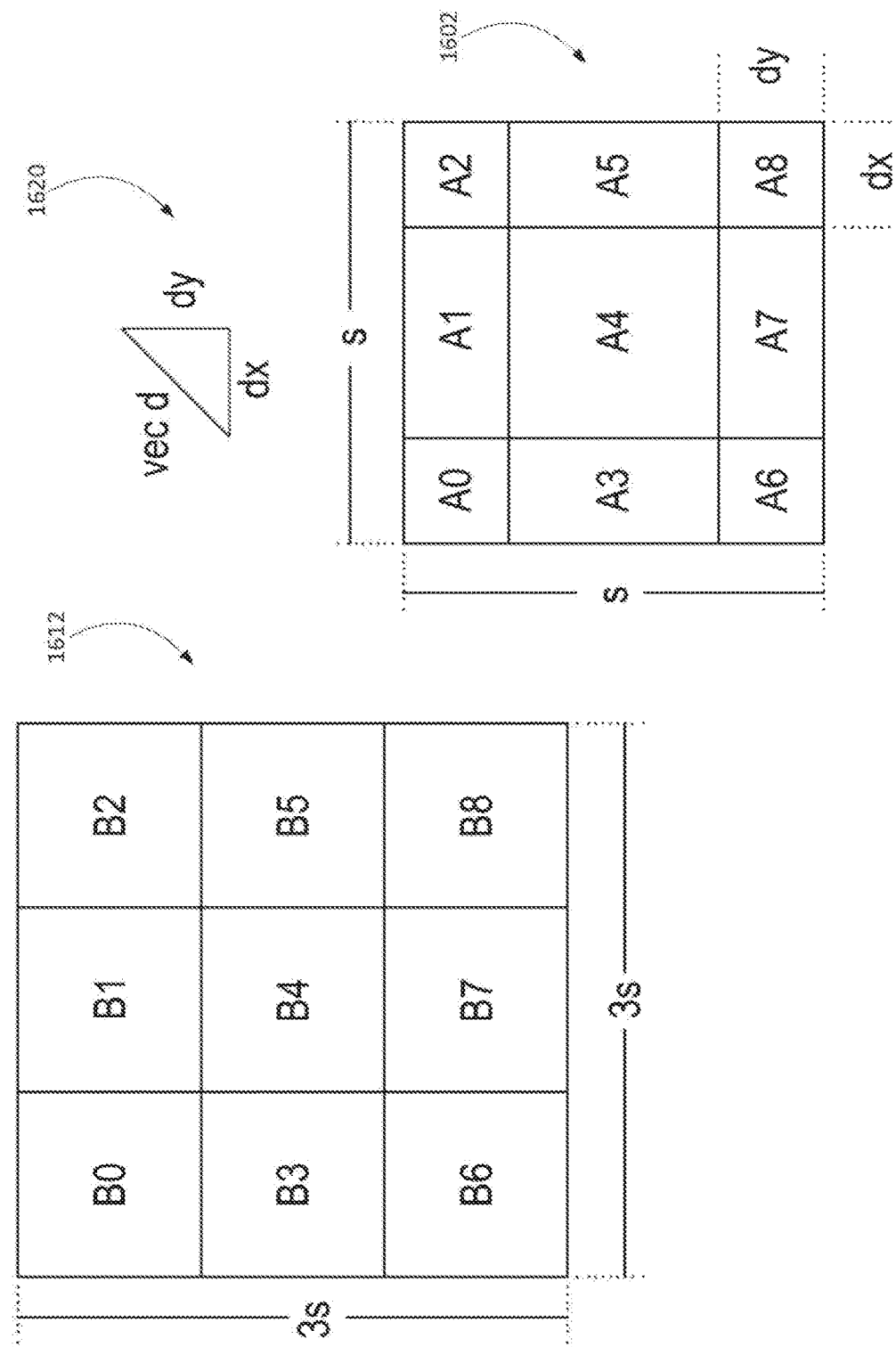
FIG. 16 shows examples of grids that can be used to calculate transition probabilities for an MDP.

FIG. 16 shows examples of grids that can be used to calculate transition probabilities for an MDP. An A-grid 1602 represents a single xy cell in an MDP policy. A B-grid 1612 represents a 3×3 arrangement of the cells of the A-grid 1602, e.g., in this example the B-grid 1612 contains nine of the single xy cells of the A-grid arranged in a 3×3 grid. The cells of the B-grid 1612 are labeled B0 to B8. Although a 3×3 grid is shown for illustrative purposes, the grids could be arranged differently (e.g., 2×2, 4×4, 3×6, etc.). The grids or cells can be shaped differently (e.g., hexagons). In this example, an avatar can take a step (in 2D in this example) represented by a vector d=(dx, dy), with dx, dy being signed changes in position in the grid. The vector d and the changes in position dx, dy are shown by graphic 1620 in FIG. 16. The length of d is less than the cell size s of the A-grid cells. The changes in position, dx and dy, can be the delta x and the delta y stored in the animation set with transitions 1508, calculated by the animation state space editor 1504.

The A-grid 1602 can be further subdivided to help calculate more accurate probabilities. In this example, the A-grid 1602 comprises 9 cells labeled A0 to A8, which are arranged in a 3×3 grid. The cells need not have the same size or shape, e.g., the cell A4 is square and larger than the cell A1, which is rectangular. Other shapes or sizes can be used. If the change in position from a first animation frame to a second animation frame is the size of dx, dy, then in some situations the position change could result in the avatar staying within the same xy cell (if the avatar is located in cell A4, for example), or could more likely result in a transition from the cell A4 (for example) to an adjacent xy cell, e.g., one of cells A0-A3 or cells A5-A8.

The B-grid 1612 can be designed so the avatar starts in the center of the grid, namely, the cell B4 in the example shown in FIG. 16. The avatar can either stay in the same B-grid cell (e.g., B4) or move to an adjacent xy cell (e.g., assuming in this example that the linear distance an avatar moves is less than s for a single move so that the most the avatar can move is to an adjacent cell). The B-grid 1612 can be moved so the probabilities are always relative to the avatar in B4. As the avatar moves/animates, the B-grid can be moved with the avatar to calculate the next probability from the same starting point. This advantageously allows the probabilities to be pre-calculated relative to this 3×3 moving B-grid 1612. It also advantageously does not require keeping track of the coordinates of the avatar motion (e.g., which could be required if the B-grid weren't moved).

The sizes of the cells of the A-grid 1612 (e.g., the cells A0-A8) can change with the components of the vector d=(dx, dy). The areas of the cells of the A-grid can correspond directly with the probability of transitioning to corresponding cells of the B-grid assuming that the starting position of the avatar in the B-grid is within the cell B4. This behavior is described by Eq. (1) described below.

In the following introductory example, rotations of the avatar are not permitted. This is not a limitation (see, e.g., the description associated with Eq. (2) below) and is intended to introduce the probability calculation concept without the additional complications due to rotations. The cells can also be referred to as states. The states of the B-grid 1612 are B0, B1, ..., B8, and as described above, the avatar is initially in the state B4 (at the center of the B-grid 1612 in FIG. 16).

The probability P of transitioning from the state B4 to another state in the B-grid 1612, assuming the initial avatar state is in the state A0 (which is in B4), can be calculated from the following set of equations.

$$P(B0) = \frac{A0}{s^2} = \frac{\max(0, -d_x * d_y)}{s^2}, \quad (1)$$

$$P(B1) = \frac{A1}{s^2} = \frac{\max(0, d_y * (s - |d_x|))}{s^2},$$

$$P(B2) = \frac{A2}{s^2} = \frac{\max(0, d_x * d_y)}{s^2},$$

$$P(B3) = \frac{A3}{s^2} = \frac{\max(0, -d_x * (s - |d_y|))}{s^2},$$

$$P(B4) = \frac{A4}{s^2} = \frac{\max(0, (s - |d_x|) * (s - |d_y|))}{s^2},$$

$$P(B5) = \frac{A5}{s^2} = \frac{\max(0, d_x * (s - |d_y|))}{s^2},$$

$$P(B6) = \frac{A6}{s^2} = \frac{\max(0, -d_x * -d_y)}{s^2},$$

$$P(B7) = \frac{A7}{s^2} = \frac{\max(0, -d_y * (s - |d_x|))}{s^2},$$

$$P(B8) = \frac{A8}{s^2} = \frac{\max(0, d_x * -d_y)}{s^2}.$$

Equation (1) assumes that the avatar start position is in the cell B4 and that dx and dy are both less than the cell size s. The probabilities in Equation (1) sum to one, namely, P(B0)+P(B1)+ ... +P(B8)=1.

If rotation is permitted (see the example rotation state 1400 shown in FIG. 14), each transition probability P can include an integral over the permitted angles in the rotation state space. For example, the probability of transitioning from the state B4 to the state B0 is $$P(B0) = \int_{-\pi/8}^{+\pi/8} \frac{\max(0, -(d_x\cos(\theta) - d_y\sin(\theta)) * (d_x\sin(0) + d_y\cos(\theta)))}{s^2} d\theta, \quad (2)$$

To evaluate Equation (2), the system can utilize any type of numerical quadrature algorithm such as, e.g., the trapezoidal rule, Simpson's rule, Gaussian quadrature, or Monte Carlo techniques.

Calculating the transition probabilities from Equation (2) can be computationally intensive, especially when avatar rotation is permitted. Accordingly, some embodiments of the state space builder 1512 may utilize a statistical technique to estimate the MDP state transition probabilities 1516.

Example Statistical Technique for State Transition Probabilities

Additionally or alternatively to calculating the probabilities using Equations (1) or (2), a statistical method using N randomly selected points and/or rotations within a single state can be selected. An animation can be run from a starting state, for example, using the delta x, delta y, and/or delta R values calculated by the animation state space editor 1504 and output at 1508 described above, to see where the animation ends. The probability of transitioning from the starting state to an ending state can be calculated based on the number of simulations that end up in the ending state. For example, if N/2 of the N runs return a result with no transition, then there would be a 50% probability of staying in the same state. The number N can be chosen so that the resulting transition probabilities are statistically significant. In some implementations, N=10,000.

The output of the statistical calculation can be represented as a table of values including a local state, a pass through number, and an end state. Table 2 (shown below) is an example of a portion of an output table for an illustrative statistical run. The first column is the local state and enumerates the state possibilities. For example, the local states can be represented via a 3×3 grid (see, e.g., the B-grid 1612 in FIG. 16), with 0,0 representing the state at the center of the grid (e.g., the state B4 in FIG. 16). In this example there are a total of 9 (=3×3) local states. The pass through column of Table 2 measures the number of times the avatar passes through the local state. The pass through number can be used to calculate the probability of passing through one state (e.g., 0,0) to another state (depending on the row in Table 2). The end column in Table 2 is the number of times the animation ends at the local state and can be used to calculate the probability of transitioning from one state (e.g., 0,0) to another state (depending on the row in Table 2). The end column sums to N. Probabilities can be calculated by dividing the numbers in the table by N.

TABLE 2

| Local State | Pass through | End |
| --- | --- | --- |
| 0, 0 | number of times the avatar passes through 0, 0 during the animation (this is 100% since all animations start, in 0, 0 in this example) | number of times the animation ends at 0, 0 |
| 0, 1 | number of times the avatar passes through 0, 1 during the animation | number of times the animation ends at 0, 1 |
| −1, 0 | number of times the avatar passes through −1, 0 during the animation | number of times the animation ends at −1, 0 |
| Etc., for all states in 3 × 3 grid with 0, 0 at center | number of times the avatar passes through the local state during the animation | number of times the animation ends at the local state |

The pass through column allows the end probabilities to be modified to account for fail states. For example, the probability of passing through a fail state can be subtracted from the probability of reaching the end state (since if the fail state is entered, the avatar will not proceed further to the end state).

The statistical method for calculating transition probabilities has been found to be less computationally intensive than solving for the transition probabilities using Equation (1) or (2).

The transition probabilities calculated by the state space builder 1512 and output as the MDP transition probability data file 1516 (e.g., via Eqs. (1) or (2) or the statistical method) are the transition probabilities described with reference to the example MDP 1300 in FIG. 13 (e.g., if the avatar is in state $S_1$ and action $A_1$ is performed, there is a 10% probability of transitioning to state $S_2$, and so forth). These transition probabilities are not the final probabilities that apply in the MDP control policy, which is generated via the MDP valuator 1520 described below.

The MDP block 1516 can also calculate probability chains. For example, these techniques permit determining if any given animation passes through a fail state versus whether the animation ends at the fail state. The techniques also permit calculating the probability of passing through each of the adjacent states (e.g., the neighboring states in the 3×3 grid). The MDP valuator 1520 can, in effect, move this pre-calculated 3×3 grid around to quickly and efficiently determine the probability an animation will move through a fail state without needing to re-calculate the animation for every single state.

In some embodiments, each frame of an animation clip is an animation state in the animation state space. An advantage of designating each frame as an animation state is that the transition probability calculation can be implicit. A disadvantage of having all the animation frames as states in the state space is that computation of the transition probabilities may be inefficient, because the action that can be performed from most animation states is simply to transition to the next animation state. In some such embodiments, each state is an equal distance in time from its neighbor states, and clip length may not be needed in calculating the MDP discounts.

Accordingly, in other embodiments, the number of animation states in the animation state space is reduced to include the animation frames that are shared between animations. The animation state space may include only these shared frames or optionally some additional frames (e.g., transition frames or frames surrounding the shared frames). Such shared frames may be designated as animation poses. At each pose, a number of actions can be performed. Reducing the animation states to include only poses may have the possible side effect of not being able to implicitly calculate the state transition probabilities. This is because the path travelled between transitions is now possibly non-linear. Also, the distance travelled between transitions could be long enough to cross one or more physical state boundaries. Thus, when only poses are used as animation states, transition probabilities can be calculated through iteration, which may be computationally intensive. In some such embodiments, since a state can be a variable distance in time from its neighbor states, clip length may not be used in calculating the MDP discounts.

To reduce or avoid this computational load, a process for caching and reusing probabilities can be used that leverages the layout of the physical state space. For example, two data can be cached when calculating transition probabilities: the final state probability and the probability of passing through a state. These data can be stored in a local space (e.g., a cache space) and then re-applied across the full state space. The final state probability is stored to obtain the resultant probability of taking an action. The probability of passing through a state is stored so that, when applied to the full state space, failure cases can be collated from this pass through data.

The MDP transition probabilities pass to the MDP valuator 1520, which turns these probabilities—together with rewards, punishments, and discounts—into policies, which are output (or stored) at block 1536 (these policies can be the control policies 695 described with reference to FIG. 6A). A policy can be expressed as a table in the form of, e.g., [state S, action A, reward, probability] which signifies that if the avatar is in state S, the best action is A, with a probability of reaching the end state with a reward for taking that action. Some of the states will fail, which can be calculated, e.g., from the pass through column in Table 2. The MDP valuator 1520 can calculate policies by using, e.g., linear or dynamic programming techniques, value iteration (e.g., backward induction) or asynchronous value iteration, or policy iteration.

Figure 17:
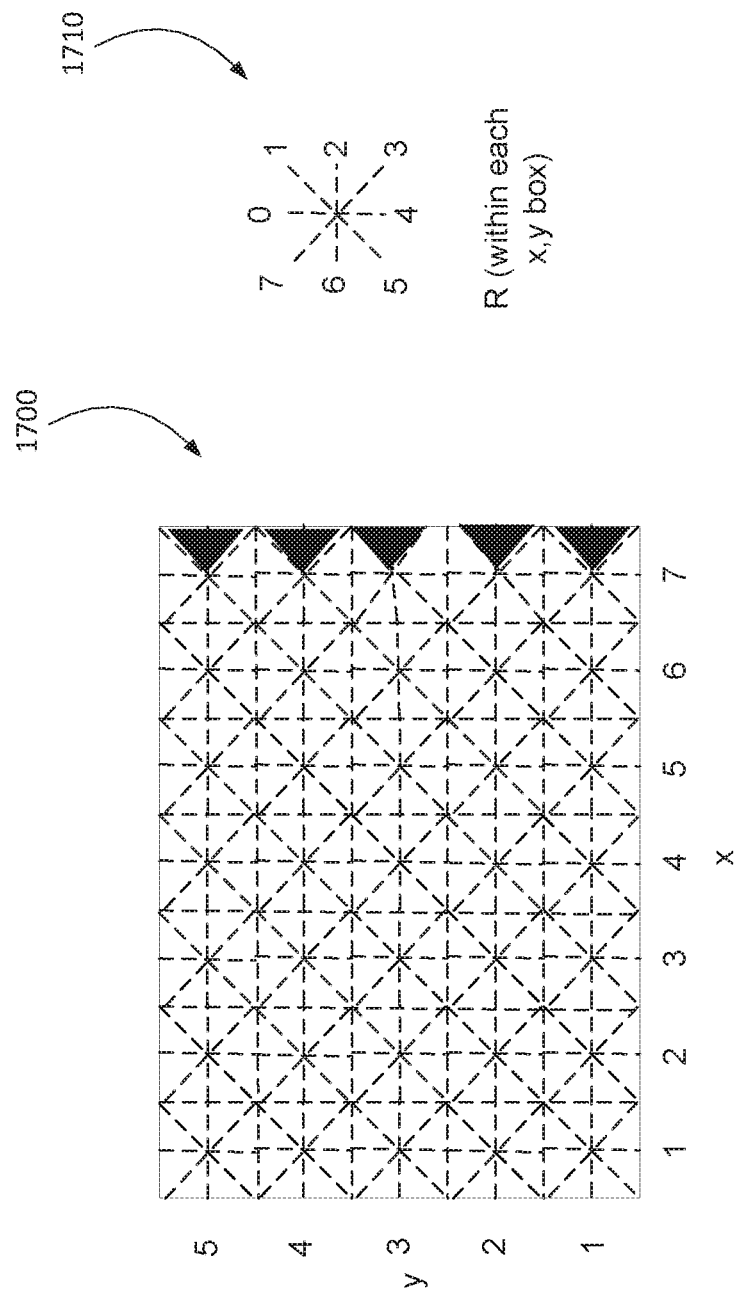
FIG. 17 illustrates a graphical example of an MDP control policy.

A schematic example of the physical portion of an MDP policy 1700 is illustrated in FIG. 17 (e.g., the animation portion of the policy is not represented in FIG. 17). The schematic 1700 shows an x-y grid of possible 2D movements for the avatar. A rotation state R 1710 is represented inside each x-y box (with possible angular orientations indexed from 0 to 7 and shown with dashed lines in this example). A state can be represented as (x, y, R). The black triangles represent the goal states (for this example, there are 15 goal states: (7, 1, 3), (7, 1, 2), (7, 1, 1), (7, 2, 3), (7, 2, 2), (7,2,1), etc.). Although the example policy 1700 is for 2D movements, this is not a limitation and MDP policies can represent 1D or 3D movements of the avatar. The rotation state R 1710 can include fewer or greater number of angular orientations for the avatar, and the orientations need not be uniformly distributed.

The MDP transition probabilities and the MDP valuation and policy calculations performed by the MDP valuator 1520 can be output (or stored) at blocks 1532, 1536. This can be advantageous because subsequent calculations can use the stored data rather than running full calculations in real time.

The example process flow 1500 therefore arrives at a set of policies 1536 that are pre-calculated offline, separate from the runtime avatar processing and rendering system 690, which is used to animate the avatar movement for a particular user based on the policies. The avatar processing and rendering system 690 can access the policies, for example, as lookups in policy table(s). The policies can be stored in non-transitory storage (e.g., the local data module 260, the remote data repository 280, 980) accessible by the system 690 or communicated wirelessly to the system 690 (e.g., via the network 990). As described further below, during runtime a policy can be selected and mapped to the navigation mesh and blend points (or tags) looked up in the policy table.

In some implementations, the process flow 1500 can be broken out into several tools. The physical state space editing workflow and the animation transition workflow can be implemented as plugins to an animation editor (e.g., the Unreal UE4 engine available from Epic Games, Inc., Cary, N.C.). At the consuming end of the workflow, the UE4 runtime policy interpreter can be in the same plugin. The state space builder 1512 can be a python script that takes the output from the animation editor (e.g., UE4) and builds the MDP transition probability file. The MDP valuator can be implemented in C++ and can use value iteration to solve for the MDP policies.

Example Runtime Use of Policies for Animating Avatar Movements

As described above, the avatar processing and rendering system 690 can move an avatar from point to point in an environment by performing the following actions. The real world environment of the avatar is mapped to identify and tag obstacles, fail states (e.g., regions where avatar movement is not permitted such as through walls or walking off of cliffs), traversable areas, and so forth. This environmental information can be stored in the map 620 described with reference to FIG. 6A. A wearable system can use the object recognizers 708 to identify these features of the environment as described with reference to FIGS. 7 and 8. The wearable system can obtain the current, starting position and orientation of the avatar and identify a desired end position and orientation of the avatar. The avatar processing and rendering system 690 can calculate a navigation path (navpath) through the environment (e.g., by finding a corridor in a navmesh). The system 690 can select a control policy (e.g., available from the policy block 1536), lay down the selected control policy, and execute the policy so that the avatar is rendered as moving to a new position (and with a desired pose) in the environment. As will be described with reference to FIGS. 18A-18M, the system 690 can iterate selecting, laying down, and executing the policy until the goal state is reached by the avatar.

FIGS. 18A-18M schematically illustrate an example of a runtime process for moving an avatar 1800 using MDP policies. The example is illustrated in the context of moving the avatar 1800 in an AR/MR/VR environment of a user of the wearable system 200; however, the example is also applicable to gaming, visual effects, etc. As will be described below, the avatar 1800 starts from a standing position facing away from a couch in a room, and the goal will be to move the avatar to stand in front of a television stand on the opposite side of the room.

Figure 18A:
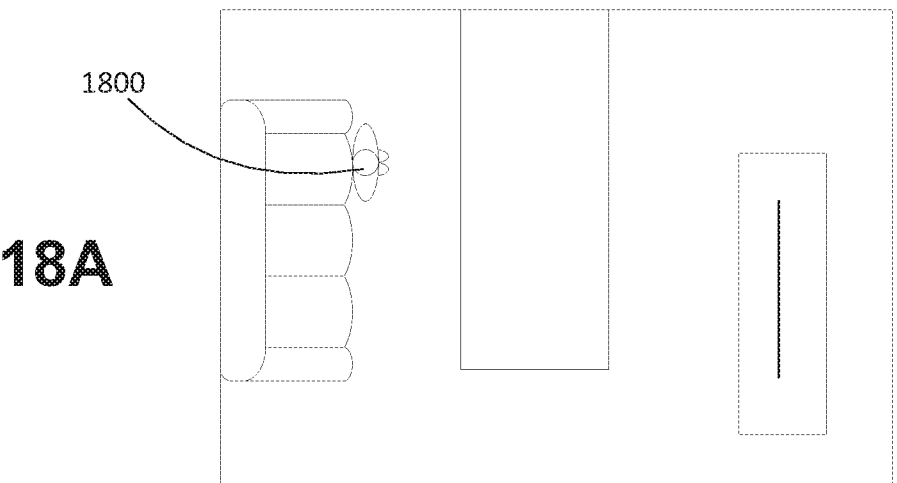
FIGS. 18A-18M schematically illustrate an example of a runtime process for moving an avatar from a starting state to a goal state using MDP policies.

In FIG. 18A, a top view of the environment of the avatar 1800 is mapped out. For example, the wearable system 200 can image the environment using the outward facing imaging system 464 and the images can be analyzed by the object recognizers 708 of the wearable system 200. The contextual information analysis system 688 can analyze such images alone or in combination with a data acquired from location data or world maps (e.g., the maps 620, 710, 910) to determine the location and layout of objects in the environment. In a gaming scenario, a game developer can map out the environment of the avatar. In the example shown in FIG. 18A, the environment is a living room. All the doors to the room are closed so the environment is a contained room for ease of illustration (although this is not a limitation).

Figure 18B:
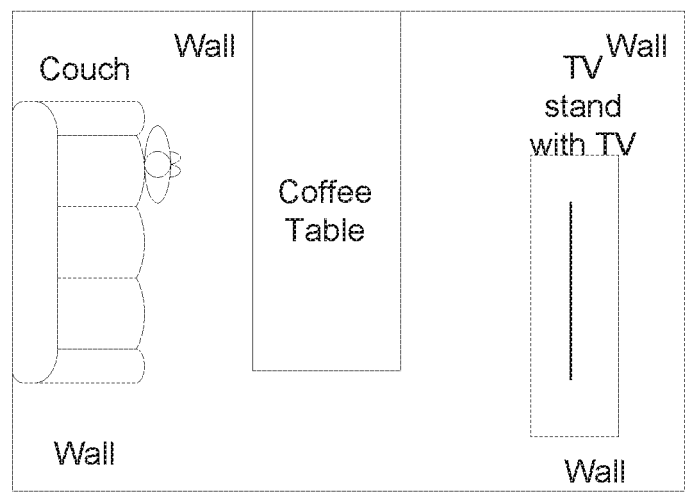

In FIG. 18B, obstacles and failure states are tagged. For example, the object recognizers 708 can categorize the objects in the room and the contextual information analysis system 688 can determine the context of the object (e.g., obstacle, fail state, navigable or traversable area, etc.). In this example, the avatar 1800 is standing in front of a couch and facing a coffee table. Walls surround the environment. A television stand supporting a television is across the room from the avatar. The walls, couch, and coffee table can be categorized as obstacles, because the avatar 1800 cannot move through them and instead must move around them. The television stand can also be tagged as non-navigable by the avatar 1800, but as noted above, the goal will be to move the avatar 1800 to stand in front of the television stand.

Figure 18C:
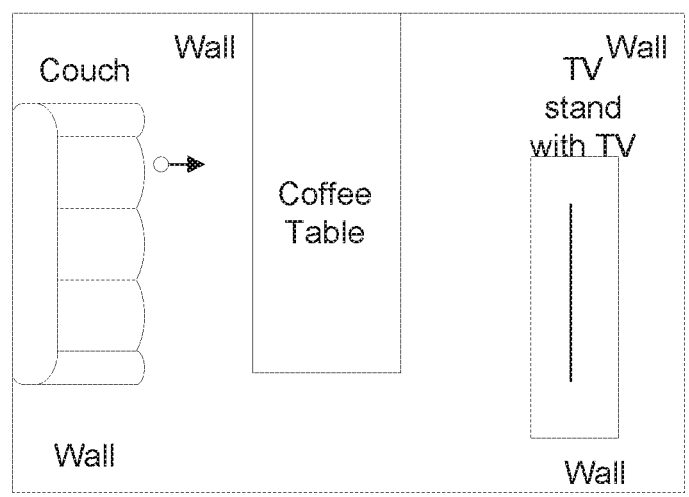
Figure 18D:
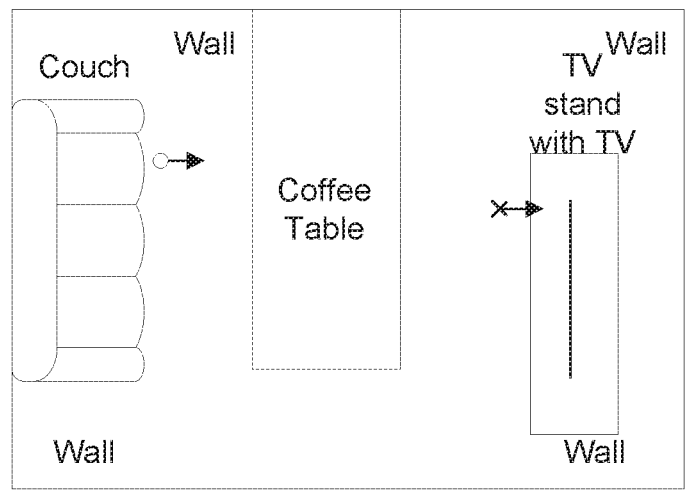

In FIG. 18C, the starting position and orientation (e.g., pose) of the avatar are determined. In the following figures, the position of the avatar is shown with a circle and its pose is shown by an arrow. In FIG. 18D, the avatar's goal state (or end state) is received. The position of the goal is shown with a cross (in front of the television stand), and the avatar's pose at the goal is shown with an arrow (indicating the avatar should face toward the television). The goal state may be received based on the context of the AR/MR/VR or gaming scenario. For example, a user may wish to move the avatar to the television and have the avatar change channels.

Figure 18E:
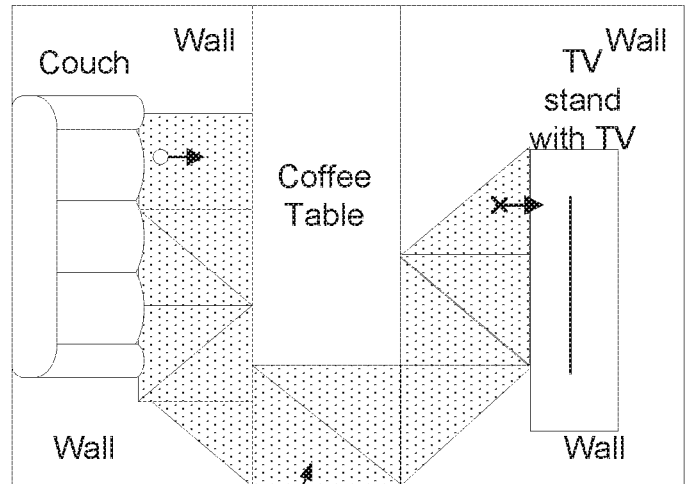

In FIG. 18E, a navigation path (navpath) is calculated that permits the avatar to move through traversable areas of the environment from the starting state to the goal state. In this example, the navpath comprises a navmesh 1820 shown as shaded triangles (see, e.g., the description of the navmesh 1100 in FIG. 11). The navpath (or navmesh) can be calculated using any suitable technique (e.g., A* or Dijkstra methods). The navmesh 1820 includes areas in front of the couch, goes around the coffee table (which is an obstacle/fail state), to the area in front of the television stand. The starting position (open circle) and the goal position (cross) are at ends of the navmesh.

Figure 18F:
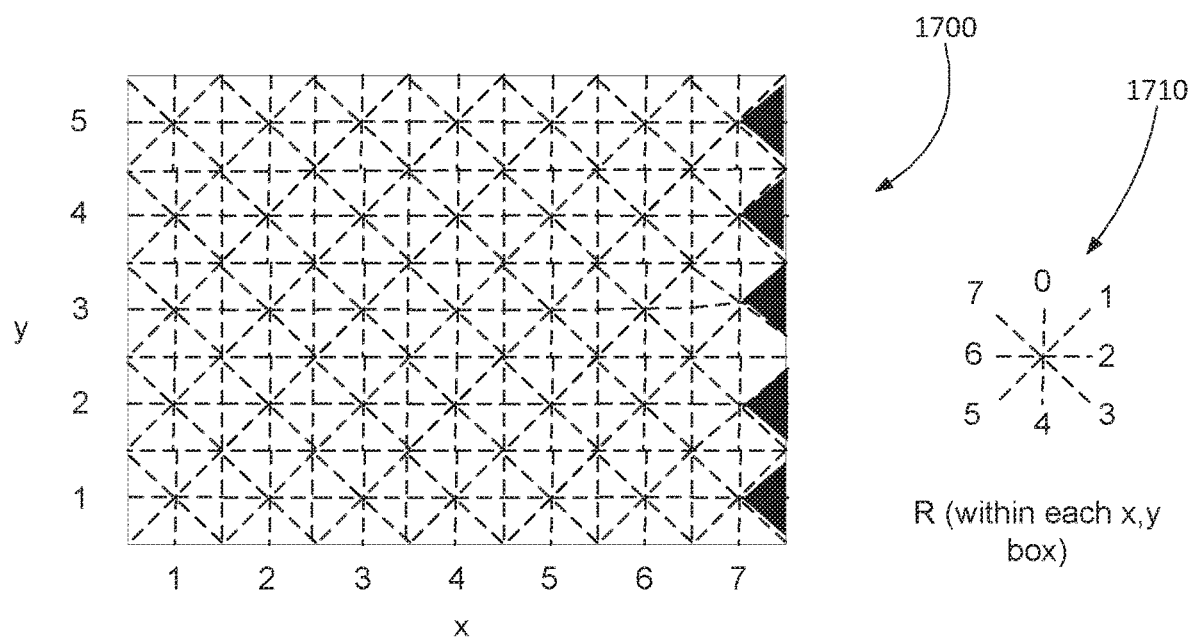

As described herein, the avatar processing and rendering system 690 can use MDP policies to select suitable animation clips from the library of animation clips to animate the avatar moving along a navpath in the navmesh 1820 to reach the goal. In FIG. 18F, an MDP policy is chosen for moving the avatar. The MDP policy can be generally similar to the policy 1700 described with reference to FIG. 17 and may include physical space (e.g., x-y) and rotation space R 1710 (e.g., orientation angles enumerated from 0 to 7). In FIG. 18F, the goal states are illustrated as black triangles. Several goal states can be included in the policy. For example, it may be acceptable for the avatar to face in the angular directions indicated by numerals 1, 2, or 3.

In some embodiments, the system 690 can select a suitable policy from a list of policies stored at block 1536 of the workflow 1500 described with reference to FIG. 15. The policy selection process can proceed as follows, in some embodiments. Some policies may have been created so that the avatar could perform a particular action. The process can generate a stack of policies for the various actions. An example of a stack could include an emergency stopping stack (e.g., performing a sudden stop), a stack where the avatar stops at the end of the path or the middle of the path, etc. A stack of policies can include policies that are grouped by a common goal.

The process can exclude policies within a stack that do not fit within the navpath or the navmesh. The process then lays down the remaining policies in the stack, one at a time, onto the navmesh. An example for laying down the policy on various locations of the navmesh is to have the goal state on a line between two triangles of the policy (see, e.g., FIG. 18F) with the goal state centered relative to the mesh, and then the goal state left justified relative to the mesh, and then the goal state right justified relative to the mesh. Other examples include placing the policy so that an end state is in the center of a triangle.

The process can calculate a score for each policy and then select, as the chosen policy, the policy having the highest score. To calculate the score, the process can use a weighted sum. For example, each parameter (e.g., distance, probability of success of achieving a desired state or goal state, reward) can be multiplied by an associated weight (e.g., distance weight, probability weight, reward weight, etc.) and then summed. The distance can be represented by one or more metrics, e.g., the distance moved by the avatar from a starting position within the policy to an ending position within the policy, the distance to a final end position along a corridor, or distance to an edge of the corridor (which the policy may want to maximize to keep the avatar in a safer position).

The weights can be chosen to balance the highest chance of reaching the goal state with going the furthest and having a large reward. Weights may be set by an animation designer to achieve the design objectives for an animation application or the environment in which the avatar moves. For example, in some scenarios, the AR/MR/VR application using the MDP techniques described herein may want an avatar to explore or wander around in the environment (e.g., an educational application for example), and may thus use a lower weight associated with a reward of reaching an end goal. Other AR/MR/VR applications, e.g., like a social networking application, may set a higher priority on getting to the end goal (e.g., finding a new person to talk to for example) and may thus have a higher weight for the reward. The calculation of the score is computationally fast because most of the operations are lookups from the policy table.

Figure 18G:
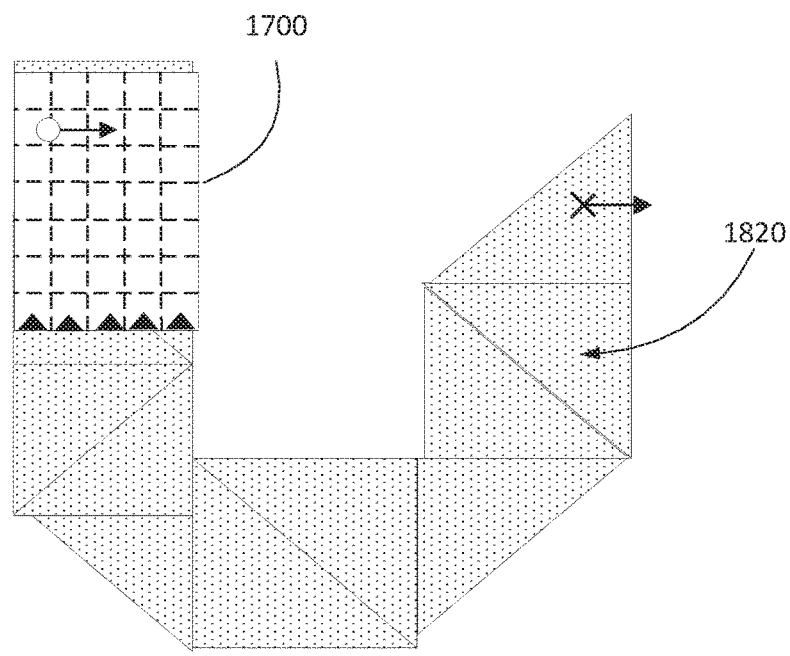

In FIG. 18G, the selected policy 1700 is laid down on the navmesh 1820. For example, as much of the policy that fits within the traversable portion of the navmesh can be used. This prevents the policy from indicating that an acceptable move is off of the navmesh. The policy can be constrained to include the current position of the avatar and to have the correct orientation relative to the navmesh, as shown in FIG. 18G. As discussed above, the system can lay down the policy 1700 in many locations and select the location which gives the highest probability or score of a match to the navmesh.

Figure 18H:
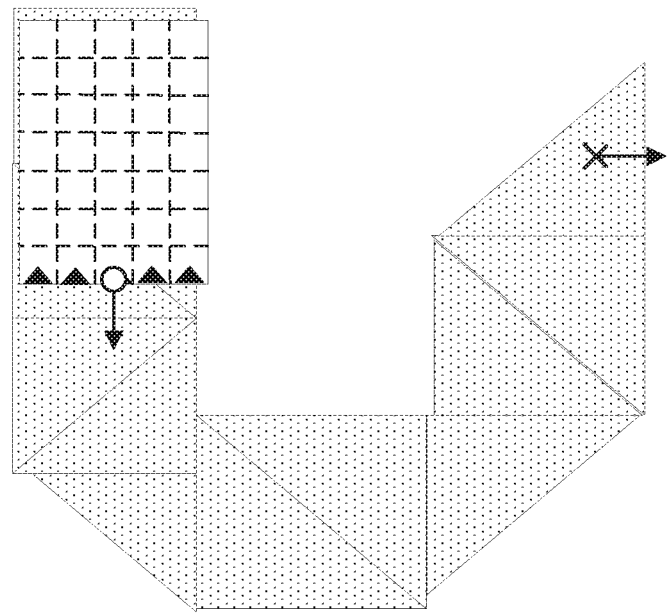
Figure 18I:
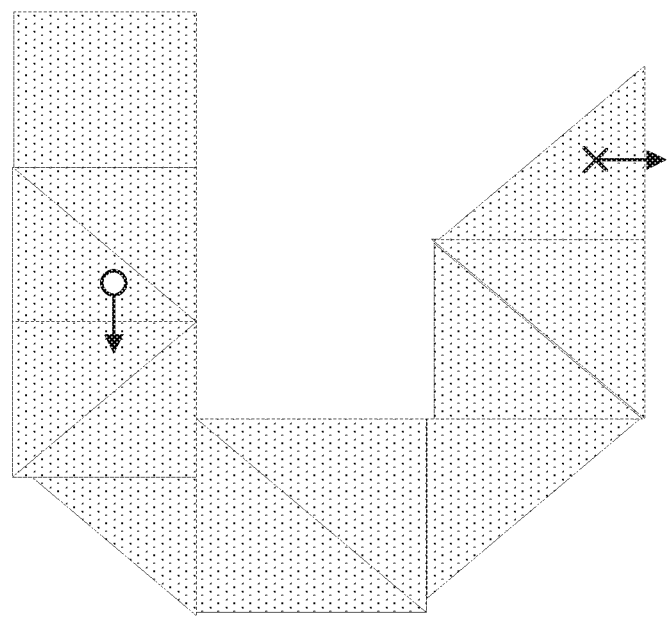

In FIG. 18H, the system runs the selected policy to move the avatar to a new position, and FIG. 18I shows the output from running the policy. As shown in FIG. 18I, the avatar has moved downward on the navmesh and is also now facing downward.

Figure 18J:
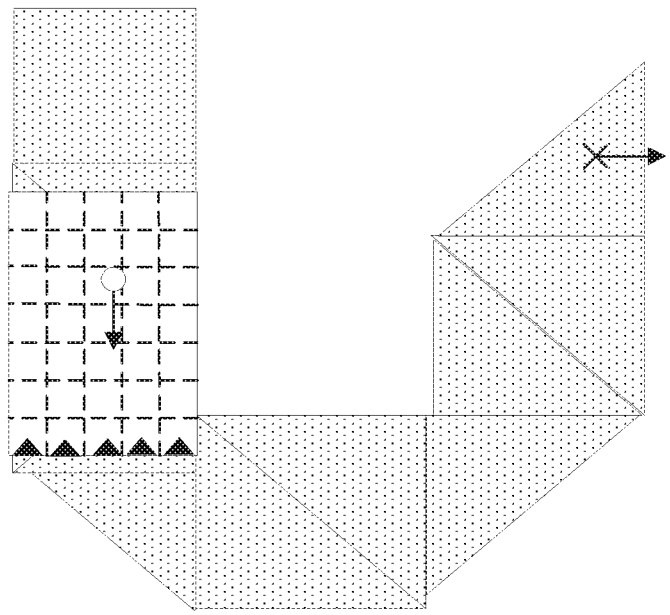
Figure 18K:
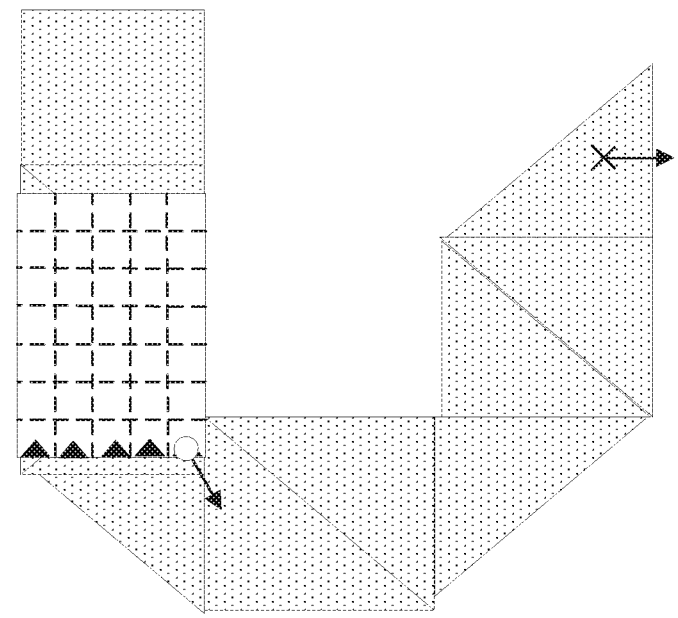
Figure 18L:
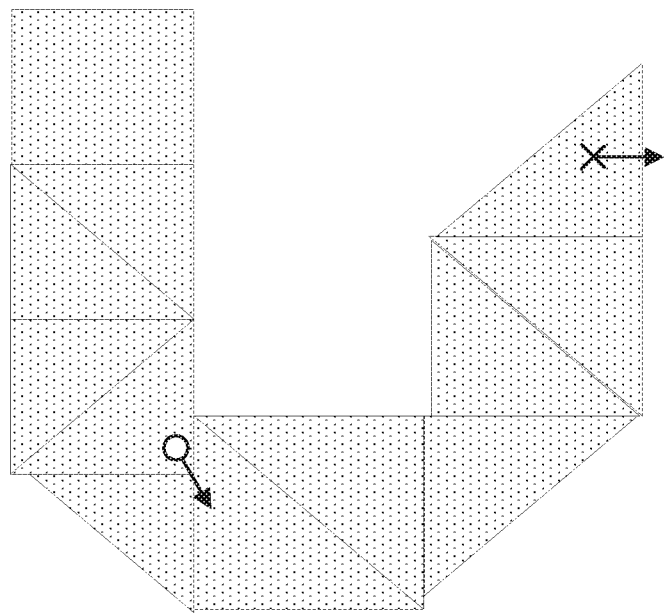
Figure 18M:
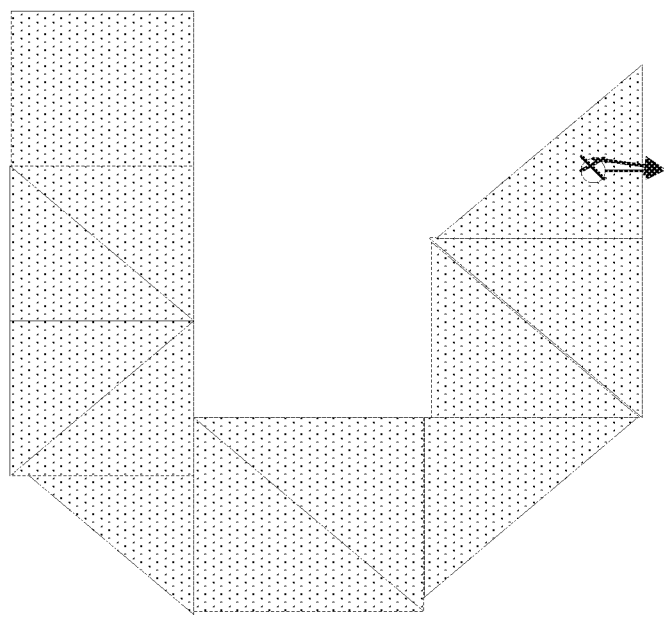

Since the avatar has not reached its goal state in FIG. 18I, the process of choosing a policy, laying it down on the navmesh, and then moving the avatar is iterated until the avatar reaches the goal state. FIGS. 18J, 18K, and 18L illustrate next steps in this example. A policy is selected (e.g., using the score technique described above) and laid down on the navmesh (FIG. 18J). The policy is run (FIG. 18K), and the avatar is moved to a new position and pose (FIG. 18L), based on the selected policy. Selecting a policy, laying down the policy, and running the policy are iterated until the avatar reaches the goal, as shown in FIG. 18M.

Additional Aspects and Advantages of MDP Systems and Methods

The present disclosure provides examples of Markov decision process (MDP) control policies that can be used to locomote an avatar in an environment. The policy state space can be defined in two categories: animation state space and physical state space (e.g., $S=S_a \cdot S_p$, as described above). Heuristics can be applied when iterating through a set of policies. These heuristics lay down each policy in several locations on the mesh, and the action with the highest probability (or highest score) of staying within the pre-calculated corridor of the navmesh is selected and applied to the avatar.

The combination of using a motion graph for the animation state space and pre-calculated MDP policies for runtime movement of the avatar can be advantageous. The combination may be thought of as a probabilistic graph walk.

An advantage of pre-calculation of the best animation clip for the avatar to take to get from a starting state to the next state is that, compared to using only a motion graph, the MDP policy approach described herein enables real-time use and provides computation and memory benefits. The state space can be localized so that it is reduced from the entire environment of the avatar to the local area where the policy is laid down. In effect, the MDP approach described herein defines a small area well, and then that area is positioned in different locations to cover the entire navmesh (see, e.g., the example described with reference to FIGS. 18A-18M).

The approach described herein can apply MDP on more complex, compound movements of the avatar that are represented in the animation clips rather than a single, simple movement of the avatar. Further, use of just motion graphs without MDP can be problematic, because motion graph capability can degrade rapidly with increases in the complexity of the environment or the number of required tasks. The MDP techniques can calculate probability chains that permit determining if any given animation passes through a fail state versus whether the animation ends at the fail state, which enables real-time use and provides computation and memory benefits. The MDP approach can utilize rewards or discounts that are based on the length of the animation clip (e.g., longer clips have a larger discount), which can enable selecting the optimal clips for the policy.

Example Processes for Calculating an MDP Policy

Figure 19:
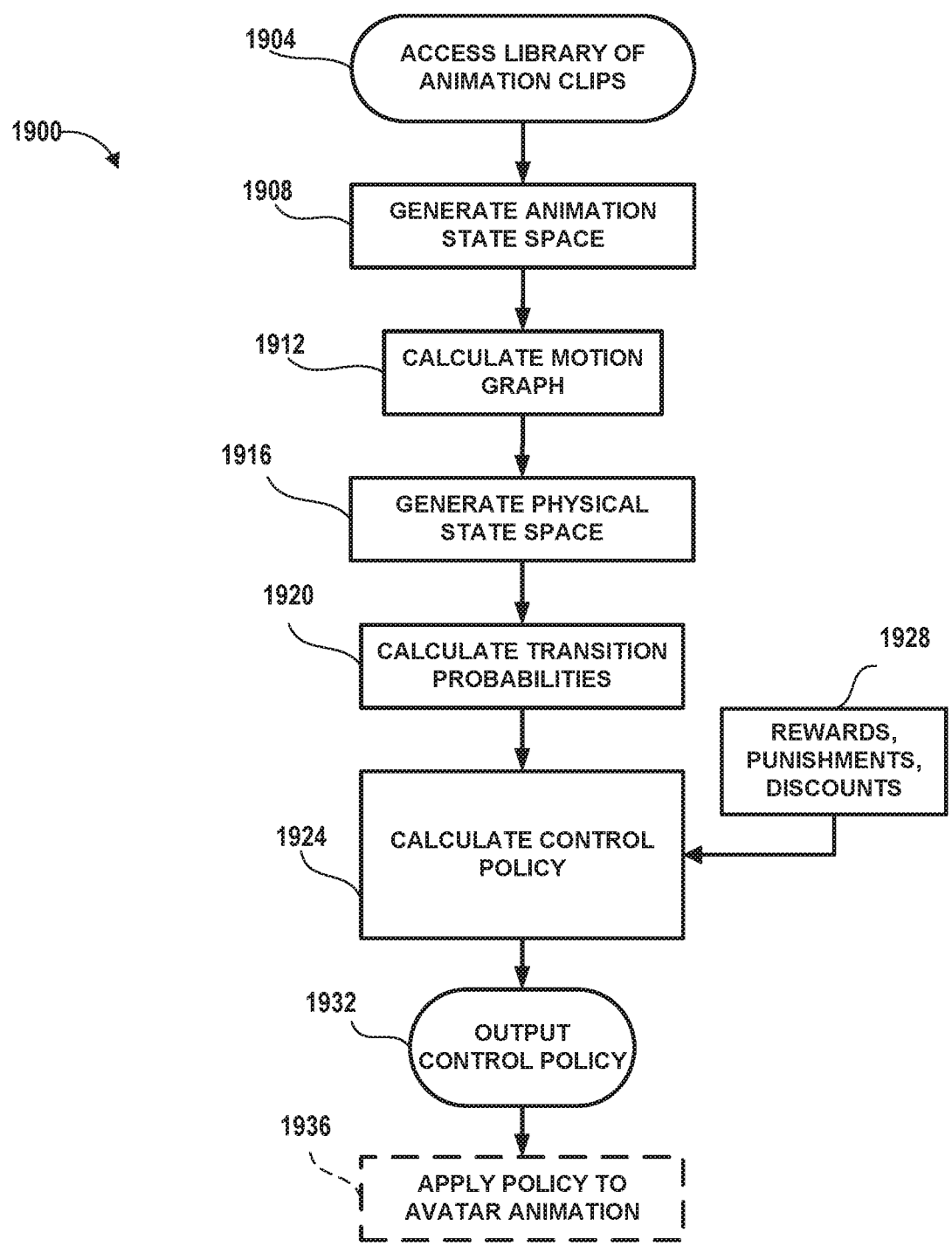
FIG. 19 is a flowchart illustrating an example process for calculating an MDP policy for animating avatar movement.

FIG. 19 is a flowchart that illustrates an example process 1900 for calculating a Markov decision process (MDP) control policy for animating avatar movement. The example process 1900 can be performed by one or more computing systems including the remote processing module 270, the local processing and data module 260, the avatar processing and rendering system 690 of FIG. 6B, the remote computing system 920 of FIG. 9A, other suitable computing device(s), and combinations of these and other computing devices. The calculated control policy can be used in the runtime avatar animation process 2000 described with reference to FIG. 20.

The example process 1900 described below is intended to be illustrative and not limiting. For example, blocks can be combined, split, omitted, reordered, or additional or different functionality can be performed in each block. Thus, the blocks of the process 1900 can be performed in a different sequence in different embodiments.

At block 1904, a library of animation clips is accessed. The library of clips can be stored in the remote data repository 280, 980. The clips can show the avatar performing a series of poses. A clip can comprise one or more frames.

At block 1908, the process 1900 can generate an animation space $S_a$. The process can identify or calculate blend points (BPs) or animation tags for the frames of the clips. The process 1900 can calculate changes (e.g., deltas) in position and rotation of the avatar from frame to frame (e.g., delta x, delta y, delta R) in the clips. These deltas can be used to calculate the transition probabilities (e.g., at block 1920). An animation clip (or BP) can be considered a fail if any frame (or BP) in the animation clip goes through a fail state, which is termed going off policy. The process 1900 can optionally perform an error check hash of the animation clips. For example, if an animation clip is edited, the hash will change upon edit so the process can determine whether the animation state space calculations need to be re-run.

In some embodiments, each frame of an animation clip is an animation state in the animation state space $S_a$. An advantage of designating each frame as an animation state is that the transition probability calculation can be implicit. A disadvantage of having all the animation frames as states in the state space is that computation of the probabilities may be inefficient, because the action that can be performed from most animation states is simply to transition to the next animation state. Accordingly, in other embodiments, the number of animation states in the animation state space is reduced to include the animation frames that are shared between animation clips. The animation state space may include only these shared frames or optionally some additional frames (e.g., transition frames or frames surrounding the shared frames).

At block 1912, the process calculates a motion graph from the frames of the animation clips that are in the animation space. The motion graph provides a selection of the animation clips to move the avatar from an initial state (e.g., initial position and initial pose) to a destination state (e.g., destination position and destination pose). The motion graph can include the BPs or the animation tags. In some embodiments of the process 1900, instead of calculating the motion graph, the process 1900 may access a motion graph that was calculated separately. For example, a motion graph may be generated manually by a human animator, and at block 1912, the process may access such a manually generated motion graph.

At block 1916, the process can generate the physical state space $S_p$. The physical state space could include spatial coordinates for the position of the avatar and rotation coordinates describing the rotation state of the avatar (see, e.g., the example rotation state 1400 in FIG. 14). For example, the spatial coordinates can be Cartesian coordinates in 1D, 2D, or 3D. The rotation coordinates can be angles in 1, 2, or 3 dimensions. The physical state space may include cell sizes and other contextual information about the environment (e.g., positions of walls, edges, traversable areas, etc.). The process 1900 can combine the animation state space $S_a$ and the physical state space $S_p$ into a state space $S_a \cdot S_p$. For example, a coordinate of a state in the state space can be $(B_p, w_p)$ where $w_p = (x, y, R)$ and $B_p$ is a blend point.

At block 1920, the transition probabilities between states are calculated. Techniques for calculating these probabilities have been described above. For example, some embodiments may calculate probabilities via the integrals given in Equations (1) or (2) (the latter including rotations). Other embodiments may utilize the statistical approach described with reference to Table 2. At block 1920, the process 1900 can calculate probability chains. For example, these techniques permit determining if any given animation passes through a fail state versus whether the animation ends at the fail state. The techniques also permit calculating the probability of passing through each of the adjacent states (e.g., the neighboring states in the 3×3 grid shown in FIG. 16 or described with reference to Table 2). For example, the process can, in effect, move this pre-calculated 3×3 grid around to quickly and efficiently determine the probability an animation will move through a fail state without needing to re-calculate the animation for every single state.

At block 1924, a control policy that identifies the best animation clip(s) (or frame(s)) to animate the next avatar movement is calculated. The process 1900 can use Markov decision process (MDP) techniques to make this calculation based on, e.g., the transition probabilities from state to state (from block 1920) and rewards, punishments (e.g., negative rewards), and discounts (from block 1928). Since the state space includes the animation state space $S_a$, the MDP process will act on BPs or animation tags associated with the animation clips. Typically, the lengths of the different animation clips in the library of animation clips will be different from each other. Due to the variability in the length of the clips, BPs (or animation tags) will tend to occur a variable amount of time from each other. Accordingly, some embodiments of the process 1900 factor in clip length into the MDP system of rewards, punishments, or discounts. As an example, a larger discount may be applied to a longer animation clip (e.g., a 3 second clip is assigned a bigger discount than a ¼ second clip).

A policy can be expressed as a table in the form of, e.g., [state S, action A, reward, probability] which signifies that if the avatar is in state S, the best action is A, with a probability of reaching the end state with a reward for that action. Some of the states will fail, which can be calculated, e.g., from the pass through column in Table 2. The process 1900 can calculate policies by using, e.g., linear or dynamic programming techniques, value iteration (e.g., backward induction) or asynchronous value iteration, or policy iteration.

At block 1932, the control policy (or policies) is output, for example, to non-transitory storage (e.g., the remote data repository 280, 980). The control policy (or policies) can be output to the wearable system 200, for example, via the network 990, and the wearable system 200 can store the policies in the local data module 260.

At optional block 1936, the wearable display system 200 can use the policies to animate the motion of an avatar in the environment of the wearer of the system 200. An example process for animating avatar movement using control policies is described with reference to FIG. 20.

Example Processes for Moving an Avatar Using an MDP Policy

Figure 20:
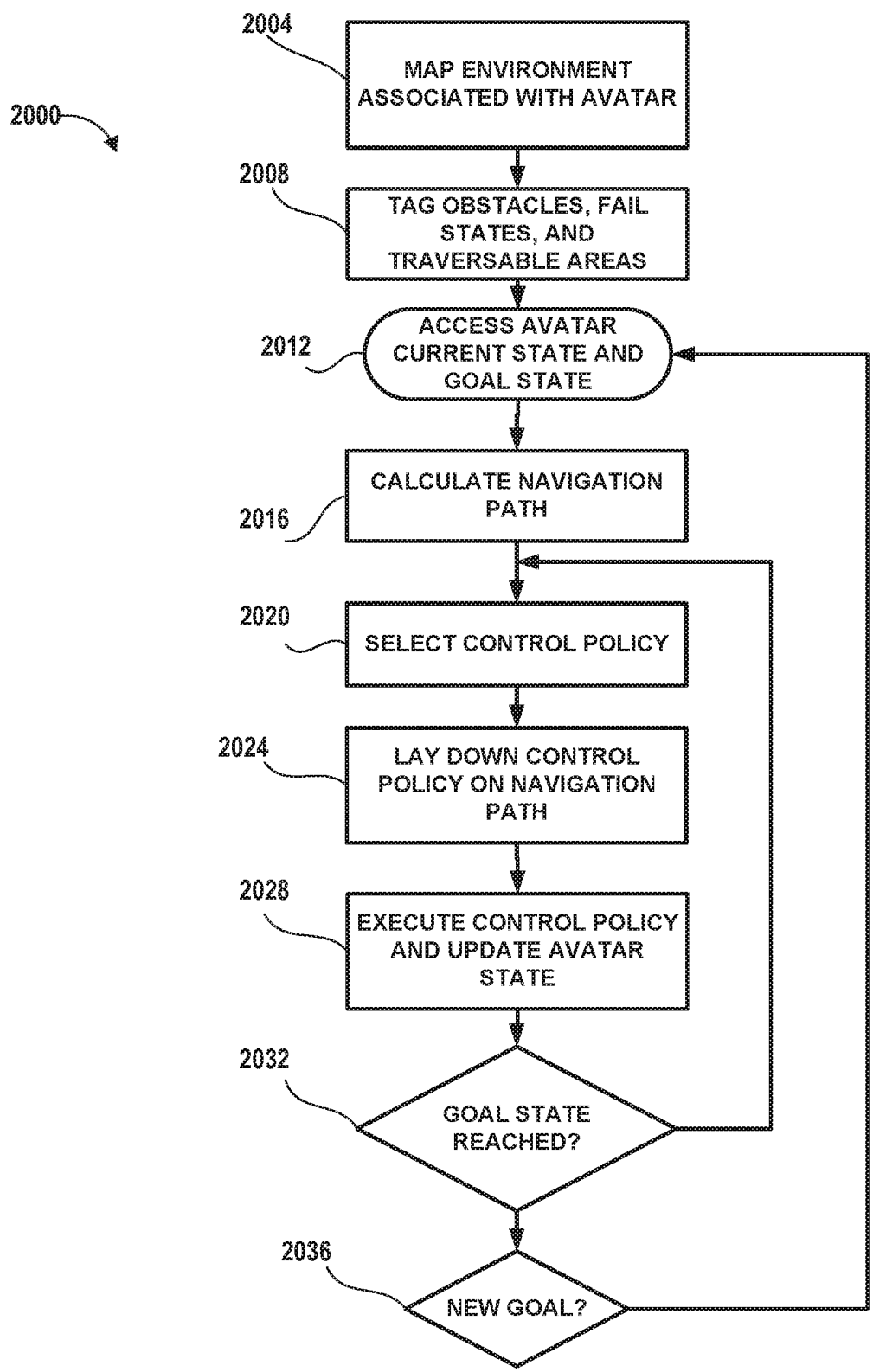
FIG. 20 illustrates an example process for animating avatar movement using a control policy.

FIG. 20 illustrates an example process 2000 for animating avatar movement using a control policy. The example process 2000 may be performed by the wearable system 200, e.g., by the remote processing module 270, the local processing and data module 260, the avatar processing and rendering system 690 of FIG. 6B, the remote computing system 920 of FIG. 9A, other suitable computing device(s), and combinations of these and other computing devices. An example of the performance of the process 2000 has been described above with reference to FIGS. 18A-18M.

At block 2004, the real world environment associated with the avatar is mapped, and at block 2008 obstacles, fail states (e.g., regions where avatar movement is not permitted such as, e.g., walls or cliffs), traversable areas (e.g., areas where avatar movement is permitted), and so forth are identified and tagged. This environmental information can be stored in the map 620 described with reference to FIG. 6A. A wearable device can use object recognizers to analyze images taken by the outward-facing imaging system 464 and identify these features of the environment as described with reference to FIGS. 7 and 8.

At block 2012, the current state and the goal state of the avatar are accessed. For example, the wearable system 200 can obtain the current position and orientation of the avatar (e.g., using sensors described with reference to FIGS. 2 and 3) and identify a desired end position and orientation of the avatar. At block 2016, the process 2000 can calculate a navigation path (navpath) through the environment (e.g., by finding a corridor in a navmesh as described with reference to FIG. 11).

At block 2020, a control policy can be selected from a stack of potential control policies. The control policies can be generated using MDP techniques as described with reference to the process flow 1500 of FIG. 15 and the process 1900 of FIG. 19. The control policies can be pre-calculated and stored, for example, in the local processing and data module 260 or in the remote data repository 280 and communicated to the wearable system 200 during runtime. As described above, the process 2000 can calculate a score for each policy and then select, as the chosen policy, the policy having the highest score. To calculate the score, the process 2000 can use a weighted sum. For example, each parameter (e.g., distance, probability of success, reward) can be multiplied by an associated weight (e.g., distance weight, probability weight, reward weight) and then summed. The weights can be chosen to balance the highest chance of reaching the goal state with going the furthest and having a large reward. The calculation of the score is computationally fast because most of the operations are lookups from the policy table.

At block 2024, the selected control policy is laid down on the navigation path (see, e.g., the examples in FIGS. 18G and 18J). At block 2028, the control policy is executed and the current state of the avatar is updated based on the optimal transition obtained from the control policy.

At block 2032, the process 2000 checks whether the goal state has been reached. If so, the process 2000 can end. If the goal state has not yet been reached, the process returns to block 2020, and blocks 2020-2028 are iterated until the goal state is reached. At block 2036, the process 2000 determines whether a new goal state has been set for the avatar. If so, the process 2000 returns to block 2012 to move the avatar to the new goal state. If the new goal state is outside of the environment that had been previously mapped and tagged (at blocks 2004, 2008), the process 2000 can instead return to block 2004 to re-map the environment. If there is not a new goal state, the process 2000 can end.

Additional Aspects

1. A system comprising: non-transitory computer storage configured to store: a library of animation clips comprising a plurality of animation clips, each animation clip showing an avatar performing a series of movements, each animation clip comprising one or more frames, each animation clip associated with a blend point associated with an avatar movement in a frame; an animation state space comprising a set of the frames from the library of animation clips, wherein an animation state in the animation state space comprises a single frame from the set of the frames; and a physical state space for movement of the avatar, the physical state space comprising a plurality of locations and a plurality of rotation states, wherein a physical state in the physical state space comprises a single location and rotation from the plurality of locations and the plurality of rotation states; and a hardware processor in communication with the non-transitory computer storage, the hardware processor programmed to: generate, from the animation state space and the physical state space, a state space comprising multiple states, wherein each of the multiple states is a state comprising a physical state from the physical state space and an animation state from the animation state space; calculate transition probabilities between at least some of the states in the state space; calculate a control policy based at least in part on the transition probabilities, the control policy specifying an action for the avatar to take when the avatar is in a particular state; and output the control policy.

2. The system of aspect 1, wherein at least some of the blend points comprise a pose of the avatar at an intermediate point of an animation clip.

3. The system of aspect 1 or aspect 2, wherein at least some of the blend points comprise a pose of the avatar at an end point of an animation clip.

4. The system of any one of aspects 1 to 3, wherein the animation state space comprises a blend point.

5. The system of any one of aspects 1 to 4, wherein the set of frames in the animation state space comprises frames that are shared between animation clips.

6. The system of any one of aspects 1 to 5, wherein the animation state space comprises a motion graph.

7. The system of any one of aspects 1 to 6, wherein to calculate the transition probabilities, the hardware processor is programmed to; calculate changes in position or rotation of the avatar between frames in the set of frames.

8. The system of any one of aspects 1 to 7, wherein to calculate the transition probabilities, the hardware processor is programmed to: evaluate an integral over a rotation state for permitted rotations of the avatar.

9. The system of any one of aspects 1 to 8, wherein to calculate the transition probabilities, the hardware processor is programmed to: perform a statistical simulation of transitions between states.

10. The system of aspect 9, wherein the statistical simulation provides data relating to a probability of an animation passing through a fail state or a probability of an animation ending in a fail state.

11. The system of aspect 9 or 10, wherein the statistical simulation provides data relating to (i) a probability of an animation starting from a first state and passing through a second state or (ii) a probability of an animation starting from the first state and ending in the second state.

12. The system of any one of aspects 1 to 11, wherein the non-transitory storage comprises a cache, and the system is configured to store in the cache a probability of passing through a state or a final state probability.

13. The system of any one of aspects 1 to 12, wherein to calculate the control policy, the hardware processor is programmed to evaluate a Markov decision process (MDP).

14. The system of aspect 13, wherein the MDP utilizes rewards, punishments, or discounts.

15. The system of aspect 13 or aspect 14, wherein at least one of the rewards, punishments, or discounts is based at least in part on a length of an animation clip.

16. The system of aspect 15, wherein a first discount associated with a first animation clip is larger than a second discount associated with a second animation clip if a length of the first animation clip is longer than a length of the second animation clip.

17. The system of any one of aspects 1 to 16, wherein the hardware processor is programmed to generate a hash for each of the plurality of animation clips.

18. The system of aspect 17, wherein the hardware processor is programmed to; determine if any of the hashes of the plurality of animation clips have changed; and in response to a determination that at least one of the hashes has changed, re-calculate the transition probabilities.

19. The system of any one of aspects 1 to 18, wherein to output the control policy, the hardware processor is programmed to communicate the control policy to a wearable display system.

20. A wearable display system comprising: an outward-facing imaging system configured to image an environment of the wearable display system; a display system configured to render virtual content to an eye of a user of the wearable display system; non-transitory computer storage configured to store a plurality of control policies for animating movements of a virtual avatar, each of the plurality of control policies specifying an animation clip of a movement for the avatar to take when the avatar is in a current state; and a hardware processor in communication with the outward-facing imaging system, the non-transitory computer storage, and the display system, the hardware processor programmed to: access images of the environment of the wearable display system; map the environment of the wearable display system based at least in part on the images; identify obstacles, traversable areas, or fail states in the environment; calculate a navigation path for movement of the virtual avatar from a current position to an end position; and iterate until the current position of the virtual avatar reaches the end position for the virtual avatar: select a control policy from the plurality of control policies; lay down the selected control policy on a portion of the navigation path that includes the current position of the virtual avatar; execute the control policy; cause the display system to render movement of the avatar based on the executed control policy; and update the current position of the virtual avatar based on the executed control policy.

21. The wearable display system of aspect 20, wherein each of the plurality of control policies comprises a Markov decision process control policy.

22. The wearable display system of aspect 20 or aspect 21, wherein the navigation path comprises a mesh of polygons.

23. The wearable display system of any one of aspects 20 to 22, wherein to select a control policy from the plurality of control policies, the hardware processor is programmed to: lay down policies on a portion of the navigation mesh; calculate a score for each of the laid down policies; and choose as the selected control policy the laid down policy having the highest score.

24. The wearable display system of aspect 23, wherein the score comprises a weighted sum of a distance factor, a probability of success factor, and a reward factor.

25. A wearable display system comprising: a display system configured to render virtual content to an eye of a user of the wearable display system; non-transitory computer storage configured to store a plurality of control policies for animating movements of a virtual avatar, each of the plurality of control policies specifying an animation clip of a movement for the avatar to take when the avatar is in a current state, the non-transitory computer storage further configured to store a world map comprising information on traversable areas of an environment of the wearable display system; and a hardware processor in communication with the non-transitory computer storage and the display system, the hardware processor programmed to: calculate, from the world map, a navigation path for movement of the virtual avatar from a current state to an end state; select a control policy from the plurality of control policies; execute the control policy to identify an animation clip; and cause the display system to render movement of the avatar based on the animation clip.

26. The system of aspect 25, wherein to select the control policy, the hardware processor is programmed to: calculate a score for each of a stack of control policies; select the control policy having the highest score.

27. The system of aspect 26, wherein the score comprises a weighted sum.

28. A method comprising: storing in non-transitory computer storage: a library of animation clips comprising a plurality of animation clips, each animation clip showing an avatar performing a series of movements, each animation clip comprising one or more frames, each animation clip associated with a blend point associated with an avatar movement in a frame; an animation state space comprising a set of the frames from the library of animation clips, wherein an animation state in the animation state space comprises a single frame from the set of the frames; and a physical state space for movement of the avatar, the physical state space comprising a plurality of locations and a plurality of rotation states, wherein a physical state in the physical state space comprises a single location and rotation from the plurality of locations and the plurality of rotation states; and under control of a hardware processor in communication with the non-transitory computer storage: generating, from the animation state space and the physical state space, a state space comprising multiple states, wherein each of the multiple states is a state comprising a physical state from the physical state space and an animation state from the animation state space; calculating transition probabilities between at least some of the states in the state space; calculating a control policy based at least in part on the transition probabilities, the control policy specifying an action for the avatar to take when the avatar is in a particular state; and outputting the control policy.

29. The method of aspect 28, wherein at least some of the blend points comprise a pose of the avatar at an intermediate point of an animation clip.

30. The method of aspect 28 or aspect 29, wherein at least some of the blend points comprise a pose of the avatar at an end point of an animation clip.

31. The method of any one of aspects 28 to 30, wherein the animation state space comprises a blend point.

32. The method of any one of aspects 28 to 31 wherein the set of frames in the animation state space comprises frames that are shared between animation clips.

33. The method of any one of aspects 28 to 32, wherein the animation state space comprises a motion graph.

34. The method of any one of aspects 28 to 33, wherein calculating the transition probabilities comprises calculating changes in position or rotation of the avatar between frames in the set of frames.

35. The method of any one of aspects 28 to 34, wherein calculating the transition probabilities comprises evaluating an integral over a rotation state for permitted rotations of the avatar.

36. The method of any one of aspects 28 to 35, wherein calculating the transition probabilities comprises performing a statistical simulation of transitions between states.

37. The method of aspect 36, wherein the statistical simulation provides data relating to a probability of an animation passing through a fail state or a probability of an animation ending in a fail state.

38. The method of aspect 36 or 37, wherein the statistical simulation provides data relating to (i) a probability of an animation starting from a first state and passing through a second state or (ii) a probability of an animation starting from the first state and ending in the second state.

39. The method of any one of aspects 28 to 38, wherein the non-transitory storage comprises a cache, and the method comprises storing in the cache a probability of passing through a state or a final state probability.

40. The method of any one of aspects 28 to 39, wherein calculating the control policy comprises evaluating a Markov decision process (MDP).

41. The method of aspect 40, wherein the MDP utilizes rewards, punishments, or discounts.

42. The method of aspect 40 or aspect 41, wherein at least one of the rewards, punishments, or discounts is based at least in part on a length of an animation clip.

43. The method of aspect 42, wherein a first discount associated with a first animation clip is larger than a second discount associated with a second animation clip if a length of the first animation clip is longer than a length of the second animation clip.

44. The method of any one of aspects 28 to 43, further comprising generating a hash for each of the plurality of animation clips.

45. The method of aspect 44, further comprising determining if any of the hashes of the plurality of animation clips have changed; and in response to determining that at least one of the hashes has changed, re-calculating the transition probabilities.

46. The method of any one of aspects 28 to 45, wherein outputting the control policy comprises communicating the control policy to a wearable display system.

47. A method comprising: under control of a wearable display system comprising: an outward-facing imaging system configured to image an environment of the wearable display system; a display system configured to render virtual content to an eye of a user of the wearable display system; non-transitory computer storage configured to store a plurality of control policies for animating movements of a virtual avatar, each of the plurality of control policies specifying an animation clip of a movement for the avatar to take when the avatar is in a current state; and a hardware processor in communication with the outward-facing imaging system, the non-transitory computer storage, and the display system: the method comprising: accessing images of the environment of the wearable display system; mapping the environment of the wearable display system based at least in part on the images; identifying obstacles, traversable areas, or fail states in the environment; calculating a navigation path for movement of the virtual avatar from a current position to an end position; and iterating until the current position of the virtual avatar reaches the end position for the virtual avatar: selecting a control policy from the plurality of control policies; laying down the selected control policy on a portion of the navigation path that includes the current position of the virtual avatar; executing the control policy; causing the display system to render movement of the avatar based on the executed control policy; and updating the current position of the virtual avatar based on the executed control policy.

48. The method of aspect 47, wherein each of the plurality of control policies comprises a Markov decision process control policy.

49. The method of aspect 47 or aspect 48, wherein the navigation path comprises a mesh of polygons.

50. The method of any one of aspects 47 to 49, wherein selecting a control policy from the plurality of control policies comprises laying down policies on a portion of the navigation mesh; calculating a score for each of the laid down policies; and choosing as the selected control policy the laid down policy having the highest score.

51. The method of aspect 50, wherein the score comprises a weighted sum of a distance factor, a probability of success factor, and a reward factor.

52. A method comprising: under control of a wearable display system comprising: a display system configured to render virtual content to an eye of a user of the wearable display system; non-transitory computer storage configured to store a plurality of control policies for animating movements of a virtual avatar, each of the plurality of control policies specifying an animation clip of a movement for the avatar to take when the avatar is in a current state, the non-transitory computer storage further configured to store a world map comprising information on traversable areas of an environment of the wearable display system; and a hardware processor in communication with the non-transitory computer storage and the display system, the method comprising: calculating, from the world map, a navigation path for movement of the virtual avatar from a current state to an end state; selecting a control policy from the plurality of control policies; executing the control policy to identify an animation clip; and causing the display system to render movement of the avatar based on the animation clip.

53. The method of aspect 52, wherein selecting the control policy comprises: calculating a score for each of a stack of control policies; and selecting the control policy having the highest score.

54. The method of aspect 53, wherein the score comprises a weighted sum.

OTHER CONSIDERATIONS

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time. As another example, calculating the Markov decision process control policies is highly computationally intensive (see, e.g., the example process flow 1500 described with reference to FIG. 15 or the process 1900 described with reference to FIG. 19).

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at last one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system comprising:
    non-transitory computer storage configured to store:
        a library of animation clips comprising a plurality of animation clips, each animation clip showing an avatar performing a series of movements, each animation clip comprising one or more frames and an associated blend point of a plurality of blend points;
        an animation state space comprising a set of frames from the library of animation clips, wherein respective animation states in the animation state space comprise a single frame from the set of frames; and
        a physical state space for movement of the avatar, the physical state space comprising a plurality of locations and a plurality of rotation states, wherein respective physical states in the physical state space comprise a location and rotation from the plurality of locations and the plurality of rotation states; and
    a hardware processor in communication with the non-transitory computer storage, the hardware processor programmed to:
        generate, from the animation state space and the physical state space, a state space comprising multiple states, wherein each of the multiple states comprises a physical state from the physical state space and an animation state from the animation state space;
        calculate transition probabilities between pairs of the states in the state space;
        calculate a control policy based at least in part on the transition probabilities, the control policy specifying an action for the avatar to take when the avatar is in a particular state; and
        output the control policy.

2. The system of claim 1, wherein one or more of the plurality of blend points comprise a pose of the avatar at an intermediate point of an associated animation clip.

3. The system of claim 1, wherein one or more of the plurality of blend points comprise a pose of the avatar at an end point of an associated animation clip.

4. The system of claim 1, wherein the animation state space indicates a default blend point of the plurality of blend points.

5. The system of claim 1, wherein the set of frames in the animation state space comprises frames that are shared between animation clips.

6. The system of claim 1, wherein the animation state space comprises a motion graph.

7. The system of claim 1, wherein to calculate the transition probabilities, the hardware processor is programmed to:
    calculate changes in position or rotation of the avatar between frames in the set of frames.

8. The system of claim 1, wherein to calculate the transition probabilities, the hardware processor is programmed to:
    evaluate an integral over a rotation state for permitted rotations of the avatar.

9. The system of claim 1, wherein to calculate the transition probabilities, the hardware processor is programmed to:
    perform a statistical simulation of transitions between states.

10. The system of claim 9, wherein the statistical simulation provides data relating to a probability of an animation passing through a fail state or a probability of an animation ending in a fail state.

11. The system of claim 9, wherein the statistical simulation provides data relating to (i) a probability of an animation starting from a first state and passing through a second state or (ii) a probability of an animation starting from the first state and ending in the second state.

12. The system of claim 1, wherein the non-transitory storage comprises a cache, and the system is configured to store in the cache a probability of passing through a state or a final state probability.

13. The system of claim 1, wherein to calculate the control policy, the hardware processor is programmed to evaluate a Markov decision process (MDP).

14. The system of claim 13, wherein the MDP utilizes rewards, punishments, or discounts.

15. The system of claim 14, wherein at least one of the rewards, punishments, or discounts is based at least in part on a length of an animation clip.

16. The system of claim 15, wherein a first discount associated with a first animation clip is larger than a second discount associated with a second animation clip if a length of the first animation clip is longer than a length of the second animation clip.

17. The system of claim 1, wherein the hardware processor is programmed to generate a hash for each of the plurality of animation clips.

18. The system of claim 17, wherein the hardware processor is programmed to:
    determine if any of the hashes of the plurality of animation clips have changed; and in response to a determination that at least one of the hashes has changed, re-calculate the transition probabilities.

19. The system of claim 1, wherein to output the control policy, the hardware processor is programmed to communicate the control policy to a wearable display system.

20. A computerized method, performed by a computing system having one or more hardware computer processors and one or more non-transitory computer readable storage device storing software instructions executable by the computing system to perform the computerized method comprising:
- accessing in the one or more non-transitory computer readable storage device:
  - a library of animation clips comprising a plurality of animation clips, each animation clip showing an avatar performing a series of movements, each animation clip comprising one or more frames and an associated blend point of a plurality of blend points;
  - an animation state space comprising a set of frames from the library of animation clips, wherein respective animation states in the animation state space comprise a single frame from the set of frames; and
  - a physical state space for movement of the avatar, the physical state space comprising a plurality of locations and a plurality of rotation states, wherein respective physical states in the physical state space comprise a location and rotation from the plurality of locations and the plurality of rotation states;
- generating, from the animation state space and the physical state space, a state space comprising multiple states, wherein each of the multiple states comprises a physical state from the physical state space and an animation state from the animation state space;
- calculating transition probabilities between pairs of the states in the state space;
- calculating a control policy based at least in part on the transition probabilities, the control policy specifying an action for the avatar to take when the avatar is in a particular state; and
- outputting the control policy.

* * * * *

UNITED STATES PATENT AND TRADEMARK OFFICE
CERTIFICATE OF CORRECTION

PATENT NO. : 11,257,268 B2
APPLICATION NO. : 17/051755
DATED : February 22, 2022
INVENTOR(S) : Thomas Marshall Miller, IV It is certified that error appears in the above-identified patent and that said Letters Patent is hereby corrected as shown below:

In the Specification

Column 2, Line 44 (approx.), after "process" insert -- (MDP) --.

Column 6, Line 31, delete "(IMUS)," and insert -- (IMUs), --.

Column 6, Line 49, delete "interact" and insert -- internet --.

Column 8, Line 67, line After "ultra-wideband," insert -- Wi-Fi, --.

Column 11, Line 17, delete "432b," and insert -- 432b. --.

Column 14, Line 42, delete "Where" and insert -- where --.

Column 15, Line 52, delete "Which" and insert -- which --.

Column 24, Line 33, delete "Among" and insert -- among --.

Column 29, Line 29, delete "(Which" and insert -- (which --.

Column 34, Line 58, delete "idle" and insert -- Idle --.

Column 37, Line 14 (approx.), delete "BPs," and insert -- BPs. --.

Column 39, Line 1, delete "gaining" and insert -- gaming --.

Column 41, Line 26, delete "cell." and insert -- cell --.

Signed and Sealed this
Twenty-fourth Day of May, 2022

Katherine Kelly Vidal
*Director of the United States Patent and Trademark Office*

CERTIFICATE OF CORRECTION (continued)
U.S. Pat. No. 11,257,268 B2

Column 42, Line 36-39, delete "$\int_{-\pi/8}^{+\pi/8} \frac{\max(0, -(d_x\cos(\theta) - d_y\sin(\theta)) * (d_x\sin(0) + d_y\cos(\theta)))}{s^2} d\theta,$" and insert --$\int_{-\pi/8}^{+\pi/8} \frac{\max(0, -(d_x\cos(\theta) - d_y\sin(\theta)) * (d_x\sin(\theta) + d_y\cos(\theta)))}{s^2} d\theta,$--.

Column 52, Line 58, delete "to;" and insert -- to: --.

Column 53, Line 32, delete "to;" and insert -- to: --.

Column 57, Line 65, delete "manner" and insert -- manner. --.